US010906290B2

(12) United States Patent
Yerazunis et al.

(10) Patent No.: US 10,906,290 B2
(45) Date of Patent: Feb. 2, 2021

(54) SYSTEMS AND METHODS FOR ON-ORBIT FABRICATION OF STRUCTURES BY 3D PRINTING

(71) Applicant: Mitsubishi Electric Research Laboratories, Inc., Cambridge, MA (US)

(72) Inventors: William Yerazunis, Acton, MA (US); Avishai Weiss, Cambridge, MA (US); Bingnan Wang, Belmont, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 698 days.

(21) Appl. No.: 15/474,456

(22) Filed: Mar. 30, 2017

(65) Prior Publication Data
US 2018/0281303 A1    Oct. 4, 2018

(51) Int. Cl.
| | |
|---|---|
| B33Y 30/00 | (2015.01) |
| B64G 1/10 | (2006.01) |
| B29C 64/106 | (2017.01) |
| B29C 64/386 | (2017.01) |
| B29C 64/20 | (2017.01) |
| B29C 64/118 | (2017.01) |
| B64G 99/00 | (2009.01) |
| B33Y 40/00 | (2020.01) |
| B33Y 50/02 | (2015.01) |
| B22F 3/105 | (2006.01) |
| B29L 31/30 | (2006.01) |
| C22C 1/04 | (2006.01) |

(52) U.S. Cl.
CPC ............ B33Y 30/00 (2014.12); B29C 64/106 (2017.08); B29C 64/118 (2017.08); B29C 64/20 (2017.08); B29C 64/386 (2017.08); B33Y 40/00 (2014.12); B33Y 50/02 (2014.12); B64G 1/10 (2013.01); B64G 9/00 (2013.01); B22F 3/1055 (2013.01); B22F 2003/1056 (2013.01); B29L 2031/3097 (2013.01); C22C 1/0416 (2013.01)

(58) Field of Classification Search
CPC .............................. B33Y 50/02; B29C 64/245
See application file for complete search history.

(56) References Cited

U.S. PATENT DOCUMENTS

| | | |
|---|---|---|
| 3,927,227 A | 12/1975 | Pitts |
| 7,988,096 B2 | 8/2011 | Humphries |
| 8,882,048 B2 | 11/2014 | Levin et al. |

(Continued)

FOREIGN PATENT DOCUMENTS

| | | |
|---|---|---|
| CN | 104760292 A | 7/2015 |
| CN | 104626581 | 1/2017 |

*Primary Examiner* — Peter L Vajda
*Assistant Examiner* — Asha A Thomas
(74) *Attorney, Agent, or Firm* — Gennadiy Vinokur; James McAleenan; Hironori Tsukamoto

(57) ABSTRACT

Spacecraft including a spacecraft bus. An additive manufacturing system of the spacecraft bus including at least one extruder for delivering feedstock to print an object outside of the spacecraft bus. A sensor for determining a pose of the spacecraft bus relative to an astronomical body. At least one processor in communication with the additive manufacturing system and the sensor, controls an operation of the additive manufacturing system as a function of the pose of the spacecraft bus, to manufacture the object outside of the spacecraft bus.

32 Claims, 15 Drawing Sheets

(56) References Cited

U.S. PATENT DOCUMENTS

| | | | |
|---|---|---|---|
| 10,167,091 B2* | 1/2019 | Gerwe | B64D 47/08 |
| 2012/0195994 A1* | 8/2012 | Ei-Siblani | B33Y 10/00 |
| | | | 425/174.4 |
| 2013/0342397 A1 | 12/2013 | Turbiner | |
| 2015/0210408 A1 | 7/2015 | Dunn et al. | |
| 2017/0036783 A1* | 2/2017 | Snyder | B64G 1/1078 |
| 2017/0287846 A1* | 10/2017 | Dias | H01L 23/552 |
| 2018/0010586 A1* | 1/2018 | Lichtin | B64G 1/42 |

* cited by examiner

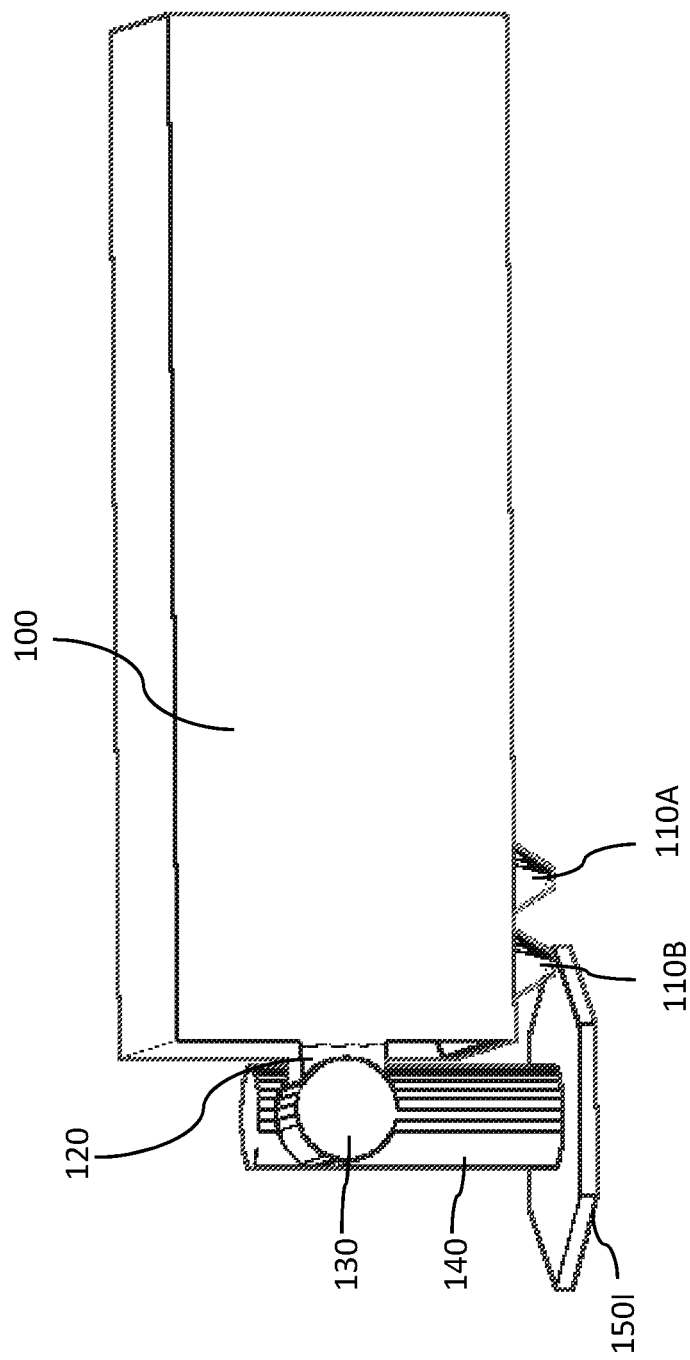

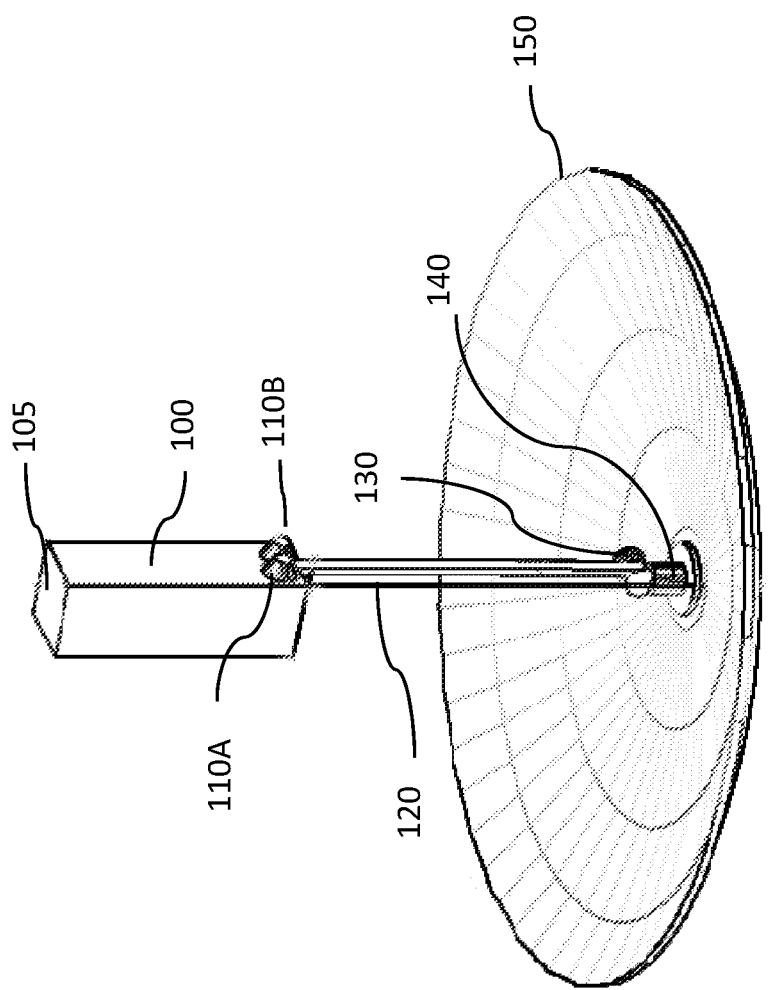

SYSTEMS AND METHODS FOR ON-ORBIT FABRICATION OF STRUCTURES BY 3D PRINTING

FIELD

The present disclosure relates generally to additive manufacturing, and more particularly to fabrication of three-dimensional (3D) objects in orbit by 3D printing.

BACKGROUND 3D printing is an additive manufacturing process for making three-dimensional objects of arbitrary shapes from digital models that are made prior to being sent into outer space for use. For example, current antennas for spacecraft such as space probes and communications satellites are generally fabricated on the ground on earth in the as-used configuration in outer space. These antennas must be over engineered to be capable of handling the acceleration and vibrational-acoustic forces of liftoff while contained within a spacecraft rocketed into space. This forces can include 14 Gs (G-forces or gravitational forces) of linear acceleration, 50 Gs of broadband vibration, 138 decibels (dB) of noise level, along with single event shocks of up to 500 Gs (according to Goddard Space Flight Center's testing protocols).

Thus, most antennas, or for that matter any structure, intended for use in space in a spacecraft are much stronger and heavier than would be required for them to perform their primary mission (of being an antenna or structure on a spacecraft in zero-gravity).

Since spacecraft launch cost and mission capabilities are almost completely dominated by the weight of the spacecraft, there is great value in finding ways in making the heavy over engineered antenna lighter.

The conventional alternative of the full-size rigid antenna is to construct the antenna to be foldable on the ground on earth, then after brought to space and during launch; a mechanism such as a motor, pyrotechnic device ("explosive bolt") or thermal expansion motor then releases the folded antenna which then unfolds in orbit to the desired shape.

Unfortunately, this makes for a very complicated and delicate unfolding mechanism prone to many problems including jamming, because of the long lever arms and low spring forces required (since there is no viscous damping due to air in a vacuum deployment, the forces must be kept low). As an example of this type of folded antenna is the Apollo AL SEP transmitter antennas, which were unfolded by the Apollo astronauts on the lunar surface and manually aimed at Earth. Another less fortunate example was the foldable antenna on the Galileo Jupiter probe, where the antenna was flexible and designed to fold up like an umbrella; however, only 15 out of 18 of the umbrella ribs actually popped free of their retaining cups, keeping the antenna partially folded. This failure greatly impacted the overall data rate of the science data returned from Jupiter, increasing mission costs while expending resources to try and fix the problem; the fix effort was unsuccessful and the mission profile was altered to work with the lower data rates available with the failed antenna. Unfolding of the antenna is only one of many problems with manufacturing a structure on the ground and then sending it to space.

For example, even with a foldable umbrella antenna there are structural limitations, such that the foldable umbrella antenna can be no larger than twice the size of the largest available dimension of the payload launch compartment. This structural limitation directly impacts operational aspects of the antenna, including reducing the maximum data rate. For example, as the transmitter power on a spacecraft is very limited along with the need for a high gain antenna, a tightly focused antenna beam is the best compensation for low transmitter power. Classically, the most tightly focused beam angle of any electromagnetic focusing device (be it antenna, lens, microscope, or telescope) with a circular aperture is 1.22 $\lambda/d$ radians, where $\lambda$ (lambda) is the wavelength and d is the diameter of the antenna and one radian is about 57.7 degrees of angle. Thus, for a tight focus of the antenna, small wavelengths (small $\lambda$) and large diameter antennas (large d) are most favorable.

Because the manufactured antenna on the ground is held to specific structural limitations, i.e. must fit folded within the spacecraft to be sent to space, significantly limits the operational use, along with quality and reliability. A traditional rule of thumb in radio antenna design is that the size of a directional antenna should be at least five, and preferably less than twenty times the wavelength of the wave it is focusing. Any smaller than five times directly affects operational use of the antenna, decreasing directionality. On the other hand, an antenna greater than twenty times the size of the operating wavelength becomes exponentially more expensive to construct, due to the precision required to be maintained over the antenna surface.

A second rule of thumb is that the positioning of the antenna reflective elements or surfaces, both reflective and refractive, must be placed within $\lambda/4$ of the ideal position, and that placement accuracy greater than $\lambda/10$ has no significant benefit in focus sharpness, only an increase in production cost and final weight Considering as an example a moderately large satellite and small wavelengths, accurate beam focusing may be accomplished using S-band microwave transmitters ($\lambda\sim=100$ mm) and a rigid, non-foldable dish having a diameter of 1 meter. This configuration gives a 12:1 beam angle, about 10 degrees, which is about twice the diameter of Earth, as viewed from Lunar orbit. However, at 440 MHz in the UHF ($\lambda=700$ mm), the same 1 meter dish is effectively useless as a directional antenna, as the dish is not significantly larger than one wavelength and 1.22 $\lambda/d$ is larger than 1 radian—that is, the beam is more than 60 degrees wide.

The problem is exacerbated for smaller satellites such as "cubesats", where the entire spacecraft may be far less than one wavelength in the UHF band (for example, the largest allowed spacecraft in the California Polytechnic Cubesat program is 100 mm×100 mm×300 mm); a fully foldable dish with radius 300 mm would have no directivity whatsoever; changing the satellite to operate on the 100 mm wavelength S band with a rigid dish of radius 50 mm (the maximum that would fit into a cubesat) would not be sufficient to make the antenna directional because 1.22 $\lambda/d$ would still be far more than 1.

Although the Cubesat program itself is intended for educational users, the idea of other microsats (very small satellites) is being explored for other purposes, especially for low earth orbit communications and resources satellites, and a directional antenna technology suitable for these satellites would be very valuable.

To summarize, a large antenna on a satellite is a "conflicted goal". The conflict is between increasing the antenna size to provide improved directionality for operational use, to save transmitter power, and to allow high data rates even in deep space missions, that goal is in conflict with the goal of having a compact and light weight space probe that is robust to the extreme G-forces and vibrations of the rocket launch.

Therefore, a need exists in the technical art for operational antennas and other structures in space that are light weight and not restricted in size that can outperform the limitations of conventional antennas sent in space.

SUMMARY

The present disclosure relates to systems and methods for additive manufacturing, and more particularly to fabrication of three-dimensional (3D) objects in orbit by 3D printing.

The embodiments of the present disclosure are based on the realization that in order to manufacture large objects outside of the spacecraft, the spacecraft have a controllable additive manufacturing system with a 3D printer, along with controlling the spacecraft pose relative to an astronomical body. A sensor of the spacecraft can determine a pose of the spacecraft relative to an astronomical body. Wherein a processor in communication with the additive manufacturing system and the sensor(s), controls an operation of the additive manufacturing system as a function of the pose of the spacecraft, to manufacture the object outside of the spacecraft.

The additive manufacturing system includes a feedstock such as a material used to construct a desired object. A feedstock container such as a spool for filament feedstock, or a tank or syringe for liquid and slurry feedstocks. It is possible the feedstock may not have a container depending upon the feedstock used. The additive manufacturing system may have a two-part catalyst/resin feedstocks, and a feedstock feed device such as a filament drive capstan and pinch roller with a motor drive for filament feedstock, or a motorized pump or motorized syringe for fluid feedstocks. At least one extruder such as a nozzle to place the feedstock at a particular location. For example, where the feedstock is thermoplastic, the additive manufacturing systems may have an extruder that includes a heater and temperature sensor to melt the feedstock. While types of additive manufacturing systems may use a liquid feedstock, the extruder may contain a mixing device to mix the resin and catalyst liquids before placement in a particular location. A positioning system to place the extrusion with the extruding feedstock at a particular desired location with respect to the location of the desired object. Further, a computer or other processor, having a memory. The memory itself can contain a set of instructions which specify, among other things, the simultaneous timing and execution of control of the feedstock movement rates, control of the temperature and mixing in the extruder, and control of the speed and motion of the extruder with respect to the object being constructed. Further still, the processor can execute these instructions as well as other instructions with the timings specified, in sequence, to construct the desired object.

The processor can be a consumer-off-the-shelf (COTS) single board microprocessor, such as an Arduino or even a Raspberry Pi. In this particular case, the microprocessor may contain auxilliary features not needed in the satellite, such as a keyboard controller, graphics display generator, but the cost and availability of these devices make them a less expensive alternative than a bespoke custom microprocessor controller.

Since we intend to use the 3D printer to manufacture objects larger than the spacecraft, among other things, we needed to overcome the harsh environmental conditions in space. The environmental condition in space is a hard vacuum containing a low density of particles, as well as including electromagnetic radiation, magnetic fields, neutrinos, dust and cosmic rays. Current 3D printing technology on Earth does not take into account the impact or effects of a micro-gravity environment in space. Some effects of a micro-gravity and a hard vacuum environment can include affecting the thermal process of 3D printing, the melt flow process of the feedstock, the melt crystallization process of the feedstock, printer hardware architecture that controls printing precision and mechanical properties.

Initially, we choose to address some of these effects to ensure the operation of 3D printer in space. Specifically, we needed to overcome the problems associated with operating the 3D printing regarding extreme high levels of light and radiation, along with extreme high and low temperatures. For example, such environmental conditions/effects disrupt or stop the 3D printing process, because 3D printing requires a specific operational environment to extrude feedstock, that is, if the feedstock is a light curing material or other type of material that changes form due to temperature. If feedstock is exposed too high levels of light and radiation and/or high or low level temperatures, then the extrusion process stops due to premature curing, resulting in clogging/blocking the extruder with cured feedstock. Also, the partially printed object or recently manufactured object can become deformed if exposed to such harsh conditions, if the feedstock is the type of material that changes form due to temperature or requires a curing time or curing exposure to ultraviolet to achieve the desired material properties of strength and durability.

Another ancillary issue we needed to consider is exposing the other components/elements of the additive manufacturing system to these harsh environments. In particular, that the components/elements of the additive manufacturing system will not become inoperable or defective due to the harsh environmental conditions of space, either before, during or after manufacture.

Our realization to manufacture large objects using a 3D printer in space outside of the spacecraft was further based on overcoming the current problems facing space exploration today. For example, how to overcome the technological limitations of some current devices used in space, such as antennas, because today's antennas are too small in size due to having to be placed within the spacecraft. Specifically, the antenna technological limitations are caused due to the structural limitation requirements based upon the spacecraft payload dimensions to carry the object (i.e. antenna), into space from Earth. Dimensions of antennas are governed by the laws of physics, in regard to wave propagation. To that end, an antenna often needs to be bigger than spacecraft itself, in order to provide a level of performance that meets today's technological advances in communication technologies, among other types of technologies.

In trying to solve this issue, we considered how to carry into space an object having a dimension greater than dimensions of the spacecraft. We understood in order to carry an antenna into space, the antenna required additional support during the launch to handle the gravity (G) forces, which greatly increases the launch cost. We further considered identifying new technological concepts regarding the construct of a foldable antenna on the ground and during the launch, where the antenna would unfold in orbit to a desired shape. However, we quickly dismissed this approach due to the fact that the unfolding mechanism of the foldable antenna is error-prone.

Our solution to the heavy antenna problem is to not construct the antenna on the ground, but rather to fabricate the antenna by 3D printing in orbit, once the spacecraft has reached nominal orbit and no further high gravity maneuvers are expected. Thus, through further experimentation, we realized we could use a 3D printer and print antennas or any other large objects directly in space, only if we considered the spacecraft pose relative to the nearby astronomical bodies. By controlling the pose of the spacecraft, we controlled the environment in the area the 3D printer prints, ensuring the printer operability and quality of the 3D manufacturing process.

The spacecraft pose can be obtained using a sensor that determines the pose relative to an astronomical body. For example, the pose of the spacecraft can include one or combination of an attitude of the spacecraft and an orbital position of the spacecraft with respect to the astronomical body. The astronomical body can be from the group consisting of the Sun, the Earth, the Moon or fixed stars. We decided to use a processor in communication with the additive manufacturing system and the sensor, to control an operation of the additive manufacturing system as a function of the pose of the spacecraft, to manufacture the object, i.e. in this case, antenna, outside of the spacecraft. The spacecraft can be termed, a spacecraft bus, or some other terminology reference, as long as the reference is to whatever vessel is used in space.

By controlling the spacecraft pose we are able to control the orientation of the spacecraft relative to astronomical body, a rate of change of light and radiation from movement of spacecraft, as well as the extreme high and low temperatures, among other things, so that the additive manufacturing system can utilize the 3D printer to print large objects in space. As noted above, the spacecraft will include a controllable additive manufacturing system with the 3D printer and at least one sensor. It is contemplated the additive manufacturing system could be contained within a portion of the spacecraft, and maneuvered outside of the spacecraft via an outer door located on an outer surface of the spacecraft. However, other configurations of the location and maneuverability of the additive manufacturing system are contemplated.

We further realized we could also further control the environment in an area the 3D printer prints, by incorporating a command system or space environmental command system. For example, the command system can include a multitude of features that relate to determining, controlling, or both, the space environmental conditions proximal to the extruder or in the area the 3D printer prints outside of the spacecraft. For example, the command system, can determine the environmental conditions in the area the 3D printer prints by: (1) a temperature sensor for determining a temperature; (2) light and radiation sensors for determine levels of light and radiation; (3) a controllable protective shield that controllably shields an amount of exposure of the light and radiation proximal the extruder area such as may be desirable to inhibit backscattered ultraviolet from the Moon ("lunar backscatter") which could prematurely harden UV-setting resins even if the spacecraft itself is in Earth shadow; and (4) a controllable monitoring device, including an imaging device or camera for controlling and monitoring the additive manufacturing process before, during and after manufacturing the object, among other things. The command system can control the environmental conditions in the area the 3D printer prints by using: (1) a controllable light reflector for controllably emitting, reflecting, or blocking a level of light onto a surface of the feedstock; (2) a controllable light source for use during the printing process, such as curing feedstock, the light source has multiple level of beams, or for providing monitoring light of the extrusion process, among other things.

Depending on the particulars of the antenna or structure being constructed and the feedstock materials to be utilized, a relatively simple three-degree of freedom printing system may suffice, if it is only required to place material on the object being built at a particular X, Y, Z location relative to the spacecraft bus. Other situations, such as placing feedstock containing long fibers (either conductive fibers for electromagnetic reasons, or long fibers of a high strength material to increase rigidity, provide dimensional stability, or increase the structural strength of the object, may require four or five degrees of freedom (such as X, Y, and Z in translation, and A and B in rotation of the extruder with respect to the local surface shape of the object being fabricated. Depending on the particular metamaterial structure design, a feedstock composed of conductive copper self-adhesive resonators may require four, five, or even six total degrees of freedom (X, Y, and Z in translation, and A, B, and C in rotation).

In addition, it may be considered that the feeding action of the extruder is itself a degree of freedom that must be controlled; temperature and pressure may also be actively controlled, intensity and positioning in X, Y, Z, A, and B of any auxiliary light sources such as blue-light or ultraviolet LEDs or lasers used for curing the placed feedstock immediately after placement must also be controlled, and finally, if an auxiliary deflector or partial mold is used, the position, temperature, and possible vibration or other actuation of the auxiliary deflector or partial mold must be controlled.

To better understand the realizations of the present disclosure, we provide at least one approach to implementing 3D printing according to at least some embodiments. For example, by non-limiting example, initially the spacecraft carries only a sturdy low-gain omnidirectional antenna during launch and into orbit, i.e. outer space, wherein initial maneuvers that may be high-gravity events may occur. The spacecraft's high gain antenna does not yet exist; it will be constructed in orbit.

Once in the destination orbit, a boom with an appropriate end flange is activated. This end flange can be used as a baseplate and a 3D-printer extrusion head can be used to construct the desired antenna shape. The feed material for the 3D printer can be preferably one of: a high temperature UV-resistant thermoplastic filament; or a thermosetting/light-setting liquid resin; or a thermoplastic filament that crosslinks in bright light or UV to become thermosetting and hence temperature resistant. Another possibility is a recrystallizing polymer such as HT-PLA, where nucleation assist additives are added to the filament; after exposure to temperatures near their creep temperature for a few minutes, the nucleation additives cause large-scale crystals to form from the glasslike extruded polymer, significantly increasing the glass transition temperature. It is possible, according to aspects of the present disclosure that a commercial product can have a sag temperature in the area of 200 deg C., which is permissible for on-orbit operation in direct sunlight.

An advantage of additive materials for such on-orbit construction is that although the material may make some relatively small dimensional change or "creep" as it undergoes final curing or crystallization. In particular, these motions are small and if only one or a few layers of material are additively deposited between curing sessions, the total error in surface position can be sufficiently small that the next pass of extruded feedstock (which is placed accurately by the positioning system) will accommodate the small curing-creep error. Thus, there is no cumulative error and the constructed object will be accurate in size and shape.

Other materials for the 3D printing may be used as well; in particular metals and ceramics may have thermal or electrical properties that make their engineering use attractive in the present disclosure. If the antenna array will be used as a reflector, a metal such as aluminum-zinc alloy, aluminum alloy, or a bulk metallic glass such as Vitreloy 1 (41% Zr, 14% Ti, 12% Co, 10% Ni, and 22% Be) will provide a rigid structure and an electromagnetically conductive surface (or a conductive backplane for metamaterial unit cells that use a backplane structure). The antenna structure need not be flat, it may be non-flat and/or encompass multiple shapes that include flat portions as well as non-flat portions.

To effectively manipulate radio waves, the antenna structure will need to either be conductive (by using a metal or a conductive feed material, for example graphene-loaded filament), or be rendered conductive on-orbit (such as by an aluminium vaporizer/sputterer) or have a conductive layer attached (i.e. adhesive metallized mylar). It is possible to not necessarily fully 3-D print the entire surface of the antenna, depending upon the application, partially printing only a grid (probably either triangular or hexagonal) can be sufficient to hold the metallized Mylar or split ring resonators in position. This decrease in volume of the antenna support structure can be particularly appealing for many reasons, because there is less mass that has to be transported to orbit, less force to maneuver the antenna, etc.

According to an embodiment of the present disclosure, includes a spacecraft having a spacecraft bus. The spacecraft bus includes an additive manufacturing system having at least one extruder for delivering feedstock to print an object outside of the spacecraft bus. A sensor of the spacecraft bus for determining a pose of the spacecraft bus relative to an astronomical body. At least one processor in communication with the additive manufacturing system and the sensor, controls an operation of the additive manufacturing system as a function of the pose of the spacecraft bus, to manufacture the object outside of the spacecraft bus.

According to another embodiment of the present disclosure, a spacecraft including a spacecraft bus having internal enclosures, wherein each internal enclosure has a set of dimensions including diagonal dimensions. The spacecraft bus including an additive manufacturing system having at least one extruder for delivering feedstock to print an object outside of the spacecraft bus. A sensor of the spacecraft bus for determining a pose of the spacecraft bus relative to an astronomical body. At least one processor in communication with the additive manufacturing system and the sensor, for controlling an operation of the additive manufacturing system as a function of the pose of the spacecraft bus, to manufacture the object, outside of the spacecraft bus. Wherein at least one dimension of a diagonal dimension of the manufactured object is greater than any of the set of dimensions or diagonal dimensions for all the internal enclosures of the spacecraft bus.

According to another embodiment of the present disclosure, a spacecraft including a spacecraft bus having internal enclosures, wherein each internal enclosure has a set of dimensions including diagonal dimensions. An additive manufacturing system of the spacecraft bus includes at least one extruder for delivering feedstock to print an object outside of the spacecraft bus. At least one sensor for determining a pose of the spacecraft bus relative to an astronomical body. A command system for determining, controlling or both, environmental conditions in space proximal an area of extruding. At least one processor in communication with the additive manufacturing system, the sensor and the command system, controls the operation of the additive manufacturing system as a function of the pose of the spacecraft bus, in combination with the command system determination of the environmental conditions or control the environmental conditions, proximal to the area of the extruder, to manufacture the object, outside of the spacecraft bus. Wherein at least one dimension of a diagonal dimension of the manufactured object is greater than any of the set of dimensions or diagonal dimensions for all the internal enclosures of the spacecraft bus.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4A is another schematic illustrating aspects of that of FIG. 1 with some components of FIG. 1 partially extended away from the spacecraft and further shows the extruders, according to an embodiment of the present disclosure;

FIG. 9 shows an entire parabolic antenna ready for use, according to embodiments of the present disclosure;

Figure 1:
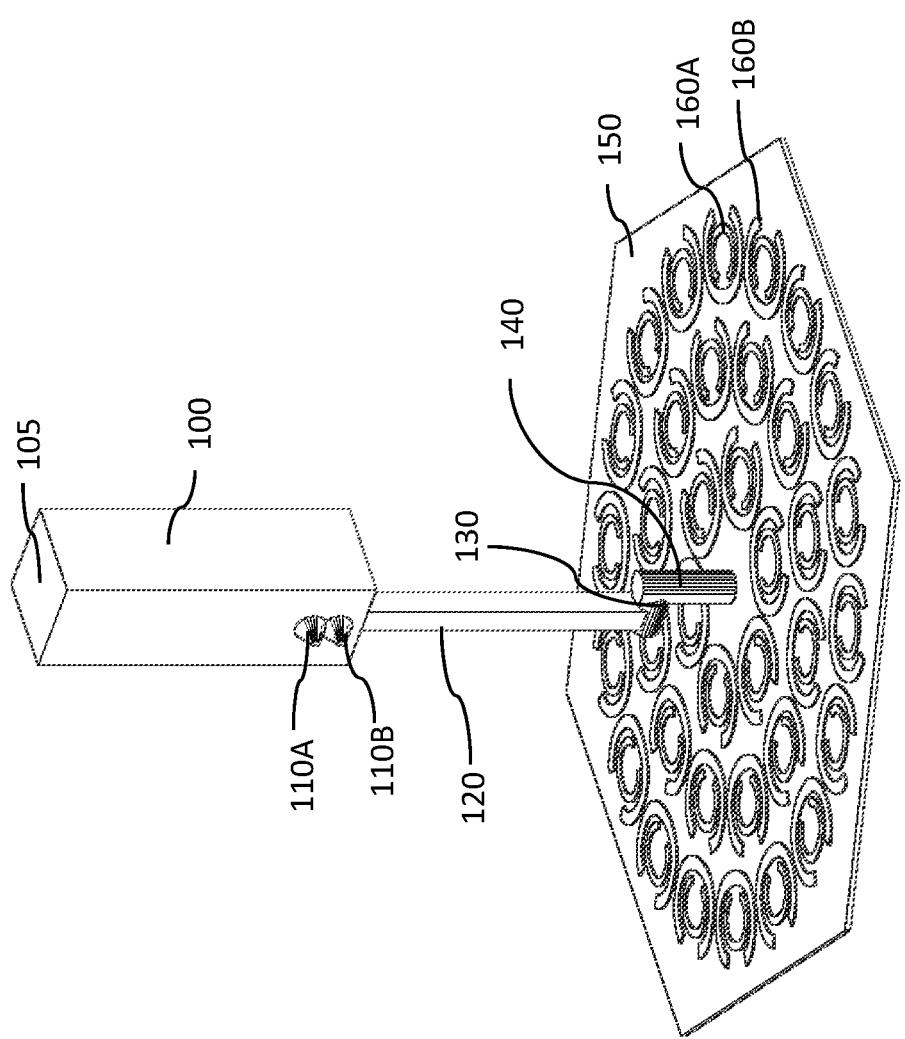
FIG. 1 is a schematic illustrating some components of an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates to systems and methods for additive manufacturing, and more particularly to fabrication of three-dimensional (3D) objects in orbit by 3D printing.

The embodiments of the present disclosure are based on the realization that in order to manufacture large objects outside of the spacecraft, the spacecraft have a controllable additive manufacturing system with a 3D printer, along with controlling the spacecraft pose relative to an astronomical body. A sensor of the spacecraft can determine a pose of the spacecraft relative to an astronomical body. Wherein a processor in communication with the additive manufacturing system and the sensor, controls an operation of the additive manufacturing system as a function of the pose of the spacecraft, to manufacture the object outside of the spacecraft.

Initially, we choose to address how to overcome the environmental effects in space to ensure the operation of 3D printer outside of the spacecraft. Specifically, we needed to overcome the problems associated with operating the 3D printer regarding the extreme high levels of infrared radiation, visible light, and ultraviolet radiation, along with extreme high and low temperatures, and lack of an atmosphere causing lack of convective cooling (in effect, every object in free space is in the heat-transfer equivalent of a vacuum insulated, i.e. "Thermos" tin, bottle), among other things. For example, such environmental effects disrupt or stop the 3D printing process, such that 3D printing requires a specific operational environment to extrude feedstock, from the extruder before and during extrusion, as well as after extrusion. For example, if the feedstock is a light curing material or other type of material that polymerizes due to the presence of ultraviolet (UV) light. Further, if feedstock is exposed too high levels of light or radiation and/or high or low level temperatures, then the extrusion process stops due to prematurely curing or freezing the feedstock, resulting in clogging/blocking the extruder with cured feedstock or deforming the partially printed object. Of which, the deformed partially printed object or recently manufactured object then becomes defective and non-usable.

Another ancillary issue we needed to consider when 3D printing in space, is exposing other components/elements of the additive manufacturing system to these harsh environments. In particular, that the components/elements of the additive manufacturing system do not become inoperable or defective due to these harsh environmental conditions, either before, during or after manufacture.

However, despite the above environmental space challenges, we realized that by using a 3D printer in space we overcome many of today's problems facing Satellite antenna manufacturing and deployment. For example, how to overcome the technological limitations of today's devices used in space, such as antennas, due to the antennas being too small in size, thus limiting their use. Specifically, the antenna technological limitations are caused due to their structural limitation requirements (smaller size), which are based upon the spacecraft payload dimensions for carrying the object (i.e. antenna), into space from Earth. Further, antennas packed into a spacecraft need to be overly constructed to handle gravity (G) forces to withstand the launch into space, which makes the antennas very heavy. Note, that the present disclosure considers the 3D printer, could include other dimensional printers, such as a four dimensional (4D) printer, a five dimensional (5D) printer or a six dimensional (6D) printer.

Dimensions of antennas are governed by the laws of physics, in regard to wave propagation. To that end, an antenna constructed in space needs to be bigger than spacecraft itself, in order to provide a level of performance that meets today's technological advances in communication technologies. Our solution to today's problems of the small antenna size and heavy antenna, is to not construct the antenna on the ground, but rather to fabricate an antenna by 3D printing in orbit. Once the spacecraft has reached nominal orbit, no further high gravity maneuvers are expected, so the manufactured antenna in space does not need to have the characteristics of antennas made on the ground. Thus, we realized we could use a 3D printer and print antennas in space or any other large objects directly, only if, we considered the spacecraft pose relative to some astronomical body. By controlling the pose of the spacecraft, we controlled the environment in an area the 3D printer prints, ensuring the printer operability and quality of the 3D manufacturing process.

The spacecraft pose can be obtained using a sensor that determines the pose relative to an astronomical body. For example, the pose of the spacecraft bus can include one or combination of an attitude of the spacecraft bus and an orbital position of the spacecraft bus with respect to the astronomical body. The astronomical body can be from the group consisting of the Sun, the Earth, the Moon or fixed stars. We decided to use a processor in communication with the additive manufacturing system and the sensor, to control an operation of the additive manufacturing system as a function of the pose of the spacecraft bus, to manufacture the object, (i.e. in this case, antenna), outside of the spacecraft. The spacecraft can be termed, as a spacecraft bus, or some other terminology reference, as long as the reference is to whatever vessel is used in space. By controlling the spacecraft pose we are able to control the orientation of the spacecraft relative to astronomical body, a rate of change of light and radiation from movement of spacecraft, as well as the extreme high and low temperatures, among other things, so that the additive manufacturing system can utilized the 3D printer to print large objects in space.

We further realized base we could also further control the environment in an area the 3D printer prints, by incorporating a command system or space environmental command system. The command system can include a multitude of features that relate to determining, controlling, or both, the space environmental conditions proximal to the extruder or in the area the 3D printer prints outside of the spacecraft.

For example, the command system can determine the environmental conditions in the area the 3D printer prints by: (1) a temperature sensor for determining a temperature; (2) light and radiation sensors for determine levels of light and radiation; (3) a controllable protective shield that controllably shields an amount of exposure of the light and radiation proximal the extruder area; and (6) a controllable monitoring device, including an imaging device or camera for controlling and monitoring the additive manufacturing process before, during and after manufacturing the object, among other things. The command system can control the environmental conditions in the area the 3D printer prints by using: (1) a controllable light reflector for controllably reflecting a level of light onto a surface of the feedstock; (2) a controllable light source for use during the printing process, such as curing feedstock, the light source has multiple level of beams, or for providing monitoring light of the extrusion process, among other things.

Additionally, many current photopolymer fabrication systems use a two-stage curing process; the first part of the photo-polymerization process is relatively easy to trigger at low UV intensities, and converts the feedstock from an extrudable fluid, gel, slurry, or paste into a material that is at rigid but perhaps not very strong. A second exposure, at much higher UV intensities, then crosslinks the rigidified material to its final high-strength environmentally stable form.

FIG. 1 is a schematic illustrating some components of an embodiment of the present disclosure. In FIG. 1, a spacecraft bus 100 is shown toward a top with nadir-facing (toward Earth for example) face 105 at a very top. Extruders 110A and 110B are visible on a side of the spacecraft bus 100. An extensible boom 120 attaches the spacecraft bus 100 to a tilt-motor 130, which is in turn attached to a rotation motor 140. Attached to an output shaft of rotation motor 140 is a 3D-printed mechanical support structure 150, holding a number of metamaterial unit cells 160A, 160B, etc. in their proper position. It is contemplated the operation of the additive manufacturing system can include moving the extruder 110A, 110B from an internal enclosure of the spacecraft bus to outside of the spacecraft bus, based on the pose of the spacecraft bus.

Still referring to FIG. 1, once the spacecraft is at the destination orbit, an extensible boom 120 with an appropriate end flange 150I can be activated. This end flange 150I can be used as a baseplate and a 3D-printer extrusion head 110A, 110B or extruder(s) can be used to construct the desired antenna shape. The feed material for the 3D printer can be preferably one of: a high temperature UV-resistant thermoplastic filament; or a thermosetting/UV-setting liquid resin; or a thermoplastic filament that crosslinks in UV to become thermosetting and hence temperature resistant. Another possibility is a recrystallizing polymer such as HT-PLA, where nucleation assist additives are added to the filament; after exposure to temperatures near their creep temperature for a few minutes, the nucleation additives cause large-scale crystals to form from the glasslike extruded polymer, significantly increasing the glass transition temperature.

Other materials for the 3D printing are considered as well, in particular, metals and ceramics may have thermal or electrical properties that make their engineering use attractive in the present disclosure. Depending upon the antenna array use as a reflector, a metal such as aluminum-zinc alloy, aluminum alloy, or a bulk metallic glass such as Vitreloy 1 (41% Zr, 14% Ti, 12% Co, 10% Ni, and 22% Be) can provide a rigid structure and an electromagnetically conductive surface (or a conductive backplane for metamaterial unit cells that use a backplane structure), among other things. In a case of materials that are deposited by hot melt, a choice of material may well be driven by a low melting point (for a metal) or low density of an alloy to be chosen, rather that of a high strength. For example, because the feedstock must be launched to orbit and on-orbit melting can require a significant amount of electrical energy, which on a spacecraft can be limited. However, if an as-launched system may be constructed to include a solar concentrator, then some or all of the melting energy may be derived from the freely available solar radiation, which could create a design opportunity or balance away from organic polymers and toward possibly toward metals or ceramics.

When considering an antenna structure in view of the present disclosure, the shape may be one or a combination of flat, non-flat or encompass multiple shapes. At least one method of antenna reflector construction, may include the boom extension acting with two degrees of rotational freedom at an end of the boom to produce a parabolic antenna structure. In another method may include the boom end flange 150I or the 3D-printed mechanical support structure can be kept substantially perpendicular to the boom 120 and the antenna structure is flat.

Still referring to FIG. 1, to effectively manipulate radio waves, the antenna structure will need to either be conductive (by using a metal or a conductive feed material, for example graphene-loaded filament), or be rendered conductive on-orbit (such as by an aluminium vaporizer/sputterer) or have a conductive layer attached (i.e. adhesive metallized mylar). A fourth possibility can be to use a dielectric antenna focusing arrangement, but as dielectric antennas usually use large volumes of material this is initially less appealing than the other three methods mentioned above.

The addition of adhesive reflective material to the antenna during construction can be particularly appealing, because the reflective material can either be substantially continuous (i.e. a film of aluminized Mylar which is very thin, and therefore very low weight for its physical size), or it could be small metamaterial unit cells 160A, 160B. The metamaterial unit cells 160A, 160B can be as split-ring resonators, produced similarly as flexible printed circuit board techniques, about 0.1 mm thick) which can provide lens-like (radiation is "through" the constructed antenna), or parabola-like focusing (the constructed antenna acts like a mirror), among other things.

In either case, there is no need to fully 3-D print the entire surface of the antenna, for example, partial printing would suffice so as to print only a grid (probably either triangular or hexagonal) sufficient to hold the metallized Mylar or split ring resonators in position. Thus, this decrease in volume of the antenna support structure can be particularly appealing for many reasons, especially because there is less mass that has to be transported to orbit, which relates to less propulsion force, i.e. less fuel, greater maneuverability, less required material ship into orbit, etc.

Still referring to FIG. 1, for a metamaterial-based antenna, it may be preferred depending upon the application to 3D-print the antenna support structure as a flat triangulated or hexagonal array, and the resonators 160A, 160B can be made to go at specific locations on that array. For example, consider a metamaterial-based hexagonal array antenna with the center hexagon occupied by the antenna mount, surrounded by one inner hexagon ring of six cells and an outer peripheral ring of 12 cells. In this case, there are three different radii from the antenna centerline for the metamaterial cells, and so three different resonator configurations would be necessary. These three configurations can be pre-calculated for the desired operating frequencies and could be manufactured by conventional techniques before launch, or printed as needed on-orbit.

Another alternative may be to use similar split-ring resonators 160A, 160B to produce a metamaterial, but instead of placing the split-ring resonators 160A, 160B in a hexagonal array, would place them in a rotationally symmetric circuit.

Alternatively, instead of pre-made split ring resonators 160A, 160B, the satellite could be equipped with two print-heads, for example, the first print-head could extrude an insulating material, and the second 3D print-head could extrude a conductive material, thereby printing the metamaterial resonators 160A, 160B or conductive sections in place.

Still referring to FIG. 1, according to the present disclosure, we note that the mechanical shape of the array (such as a flat plate) does not imply the "electromagnetic shape" of the metamaterial. For example, depending upon the application, a flat plate of metamaterial with properly configured (and non-uniform) unit cells could be configured as a flat mirror, or as a prism that bends the direction of the incoming wave, or as a diffraction grating (producing a spectral dispersion of a planar incoming wave), or as a parabolic reflector, reflecting an incoming wave to a focal point (producing a parallel output beam from waves originating at the focal point), or as a lens, transmitting and bending the incoming electromagnetic wave to focus it at a point (or producing a parallel beam from waves originating at the focal point.

According to aspects of the present disclosure, a metamaterial "lens" or "parabolic reflector" can be configured to sacrifice some beam tightness in the on-axis mode for a flatter field and less squint (beam disruption). This is equivalent to optimization of a high-quality camera lens for a wide flat field, even if that sacrifices the central acuity to a small extent.

Regarding the pose of the of the spacecraft bus relative to an astronomical body, a sensor can be used for determining a pose of the spacecraft bus relative to an astronomical body, pose being the rotational position of the spacecraft with respect to the fixed stars plus the orbital position of the spacecraft with respect to the planetary or stellar body the spacecraft is orbiting, plus the angular positions and visibility to the spacecraft of all relevant planetary or stellar bodies with respect to the spacecraft including shadowing effects of other bodies. Pose, being a composite measurement, is often generated by a combination of navigational radio (GPS), gyroscope (inertial navigation), and sun or star tracking cameras. Pose is important aspect of the present disclosure because at least one preferred implementation, among many, uses a feedstock polymerized by blue and ultraviolet light. Thus the illumination and shadowing aspects of pose are relevant to the present disclosure, among many aspects. At least one processor in communication with the additive manufacturing system and the sensor, controls an operation of the additive manufacturing system as a function of the pose of the spacecraft bus, so as to manufacture the object outside of the spacecraft bus. Such that, the sensor can send data to the processor, while the additive manufacturing system is manufacturing the object outside of the spacecraft bus in space.

Further, the pose of the spacecraft bus can include one or combination of an attitude of the spacecraft bus and an orbital position of the spacecraft bus with respect to the astronomical body, such that the astronomical body is from the group consisting of the Sun, the Earth, the Moon or fixed stars.

For example, an attitude control system can be mounted on the spacecraft bus for providing a motive force to maintain the pose of the spacecraft bus at or near a set of target poses. Wherein the set of target poses are determined by a set of predetermined poses stored in a memory in communication with the processor. Wherein the attitude control system is composed of one or more of reaction wheels, control moment gyroscopes, magnetic torquers, cold-gas thrusters, monopropellant thrusters, bipropellant thrusters, hall effect thrusters or ion thrusters.

Figure 2:
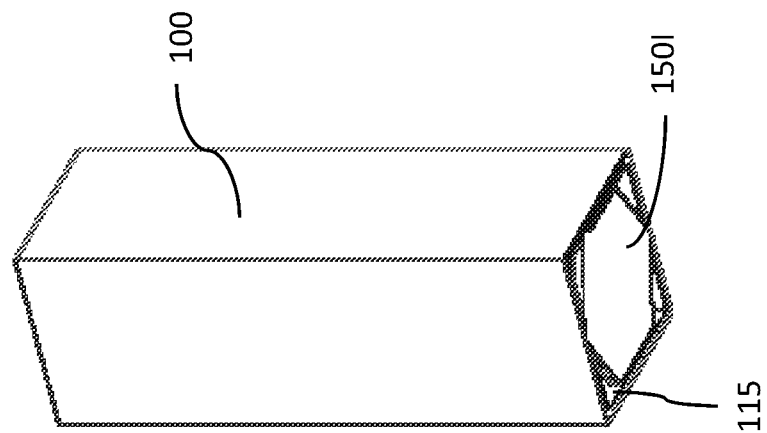
FIG. 2 is a schematic illustrating aspects of that of FIG. 1 showing an aspect of the spacecraft before and during launch, and just after initial deployment from the booster (the desired high-gain antenna has yet to be constructed), according to an embodiment of the present disclosure.

FIG. 2 is a schematic illustrating aspects of that of FIG. 1 with all the components of FIG. 1 contained within the spacecraft, according to an embodiment of the present disclosure. In FIG. 2, the spacecraft is shown in a configuration as it would normally be delivered to Earth's orbit or at the start of an interplanetary flight path. All of the components shown in FIG. 1 are contained within the spacecraft bus 100. The high gain antenna does not yet exist—it will be constructed after the spacecraft is in orbit.

At the bottom of spacecraft bus 100, a RF feed horn 115 is visible. Within the feedhorn 115 an initial build of the 3D printed mechanical support 150 is visible and incomplete, hence designated as 150I. In order to assure that the final 3D printed antenna 150 is strongly attached and avoid the common 3D printing failure mode of the built part failing to stay attached to the build platen for the duration of the build, at least one embodiment is to build the initial 3D printed support structure 150I on a standard 3D printer using the same material feedstock (or a compatible material) as the on-orbit build, then mechanically bolt/clamp it to the output shaft of rotation motor 140. This is at least one method that assures that the continued 3D printing on initial 3D printed support structure 150I into the final 3D printed mechanical support structure 150 does not fail due to the print material failing to attach or accidentally detaching during the build.

Figure 3:
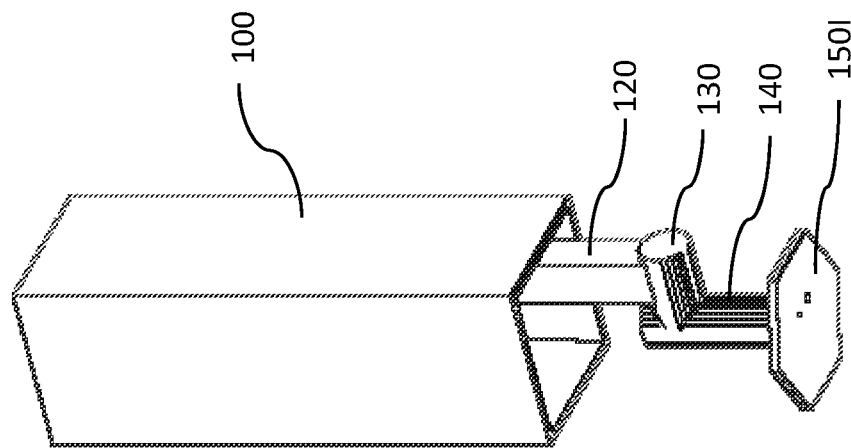
FIG. 3 is another schematic illustrating aspects of that of FIG. 1, specifically a first step in the construction of the high gain antenna, according to an embodiment of the present disclosure.

FIG. 3 is another schematic illustrating aspects of that of FIG. 1 with some components of FIG. 1 partially extended away from the spacecraft, according to an embodiment of the present disclosure. In FIG. 3, the initial deployment of the 3D printed antenna has begun. Extensible boom 120 has extended out from the spacecraft bus 100, revealing more of the feed-horn 115, tilt motor 130, and rotation motor 140. The initial part of the 3D printed mechanical support 150I remains attached to rotation motor 140.

FIG. 4A is another schematic illustrating aspects of that of FIG. 1 with some components of FIG. 1 partially extended away from the spacecraft and further shows the extruders, according to an embodiment of the present disclosure. In FIG. 4A, the tilt motor 130 has been actuated, turning 90 degrees, moving rotation motor 140 and initial 3D printed support structure 150I meets with extruder 110B. Simultaneously, extruders 110A and 110B can be extended out of the spacecraft bus 100 into operating position. In this position, extruder 110B can now begin to extrude onto the initial 3D printed support structure 150I.

At this point, the 3D printing process starts. Rotation motor 130 rotates the initial 3D printed support structure 150I past extruder 110B as extruder 110B extrudes feedstock which adheres to the 3D printed support structure 150I and then hardens, causing the 3D printed support structure to accrete in size and form the desired flat support structure shape. As the material hardens, rotation motor 140 rotates, and extensible boom 120 extends and retracts as needed to maintain the proper relative positions of the extruder 110B and 3D printed support structure 150I for continued 3D printing. Tilt motor 130 is employed to maintain the proper positioning between extruders 110A and 110B and the partially completed 3D printed support structure 150I.

Still referring to FIG. 4A, to aid visual clarity in the drawings, extruders 110A and 110B are shown as oriented in parallel with the long axis of spacecraft bus 100. This is not mandatory; depending on the particulars of the extruders 110A and 110B locations may be traverse to the long axis of spacecraft bus 100. If a single material would suffice for the entire build of the antenna, then only one extruder 110A would be needed and extruder 110B would be omitted.

Also for clarity, extruders 110A and 110B are shown as extruding parallel to the axis of rotation motor 140. It may be the case, depending on the particulars of the feedstock used and the antenna reflector design desired, that the extruders 110A and 110B should extrude substantially parallel to the long axis of extensible boom 120 instead.

Figure 4B:
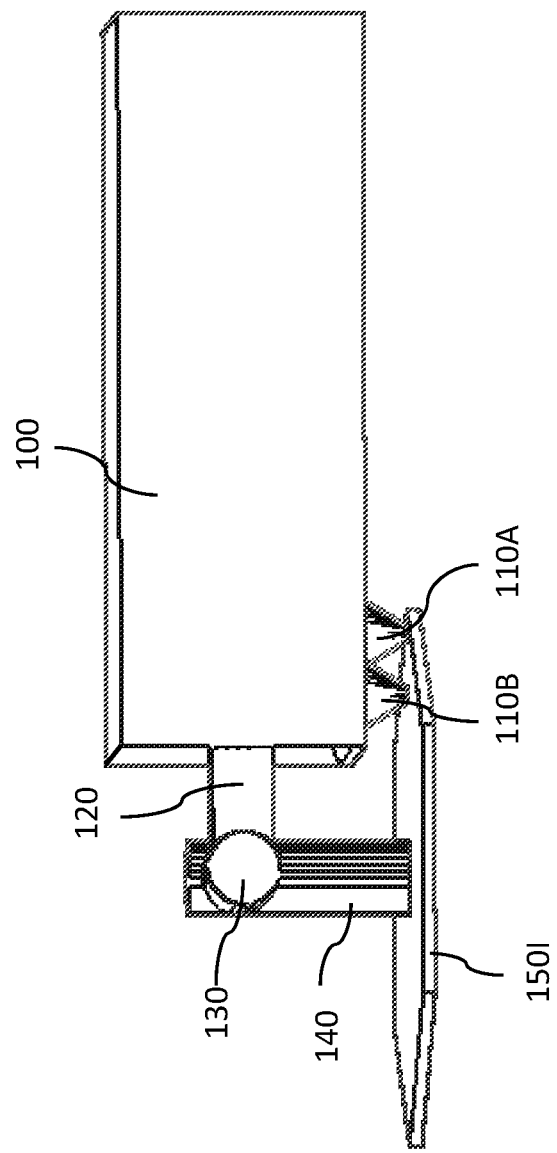
FIG. 4B is another schematic illustrating aspects of that of FIG. 4A wherein the 3D printed support structure 150I is now larger due to that the printing process has begun, according to embodiments of the present disclosure.

FIG. 4B is another schematic illustrating aspects of that of FIG. 4A wherein the 3D printed support structure 150I is now larger due to that the printing process has begun, according to embodiments of the present disclosure. Specifically, we see that 3D printed support structure 150I is now large enough to start application of metamaterial unit cells 160, whether by adhesive transfer or by extrusion of electrically conductive material by extruder 110A.

Still referring to FIG. 4B, 110A is the same type of extruder as the structure extruder 110B, but it should be understood that 110A can be a different type of extruder to accommodate a different kind of feedstock, or may be an adhesive transfer/stamper mechanism to transfer pre-made unit cells onto the 3D-printed support structure 150I. It may also be useful to have a motor-actuated secondary support arm or hook at an adhesive transfer mechanism located at the 110A position to apply pressure to the back of the 3D printed support structure 150I to assure firm application of any adhesively transferred metamaterial cells or thin metallized Mylar conductive segments.

Figure 5:
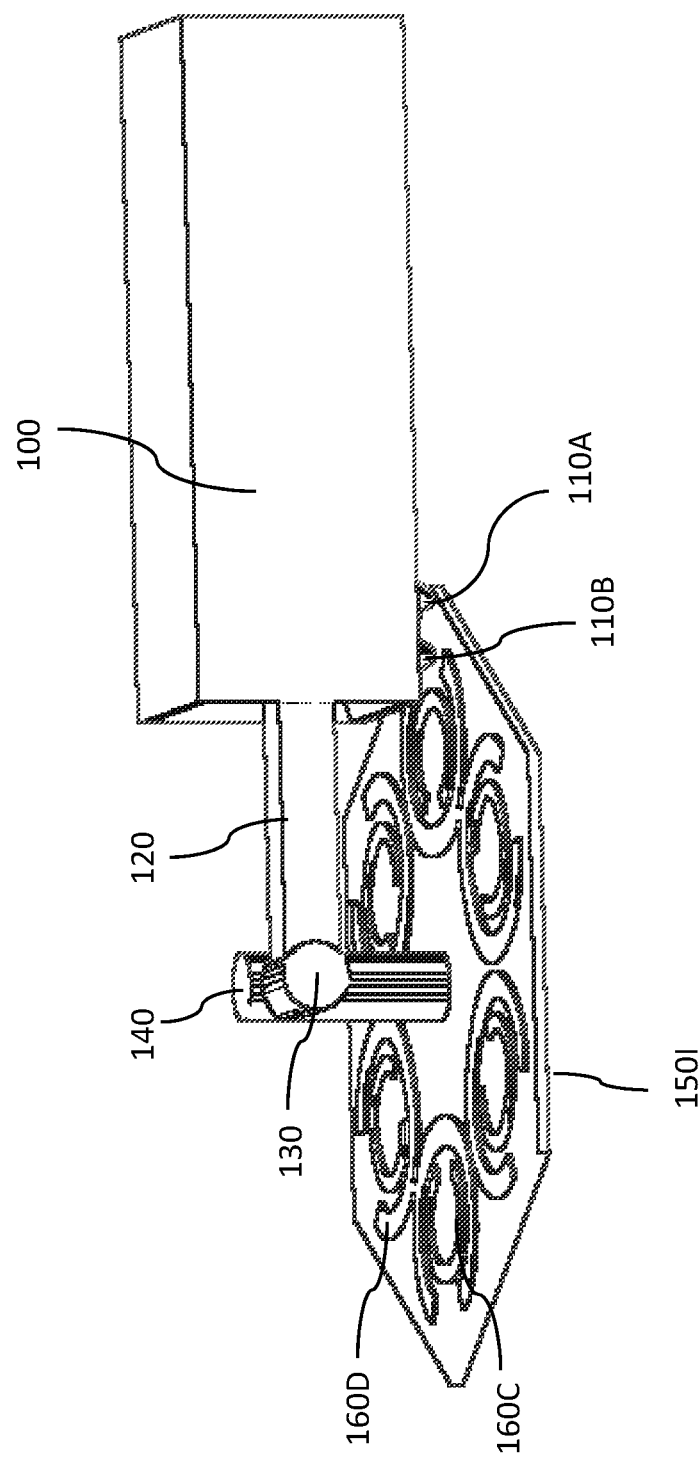
FIG. 5 is another schematic illustrating aspects of that of FIG. 4B wherein the state of the continued building process has progress, such that the 3D printed support structure 150I is now even larger due to that the printing process is further as illustrated in FIG. 4B, according to embodiments of the present disclosure.

FIG. 5 is another schematic illustrating aspects of that of FIG. 4B wherein the state of the continued building process has progress, such that the 3D printed support structure 150I is now even larger due to that the printing process is further as illustrated in FIG. 4B, according to embodiments of the present disclosure. For example, the 3D printed support structure 150I has rotated past extruders 110A and 110B, each extruding their respective feedstocks, including the conductive material, producing metamaterial split-ring resonator cells 160C and 160D etc. and a much enlarged 3D printed support structure 150I. Extensible boom 120, rotation motor 140, and tilt motor 130 all are operated in conjunction with extruders 110A and 110B to continue to build out the antenna by extrusion.

Figure 6:
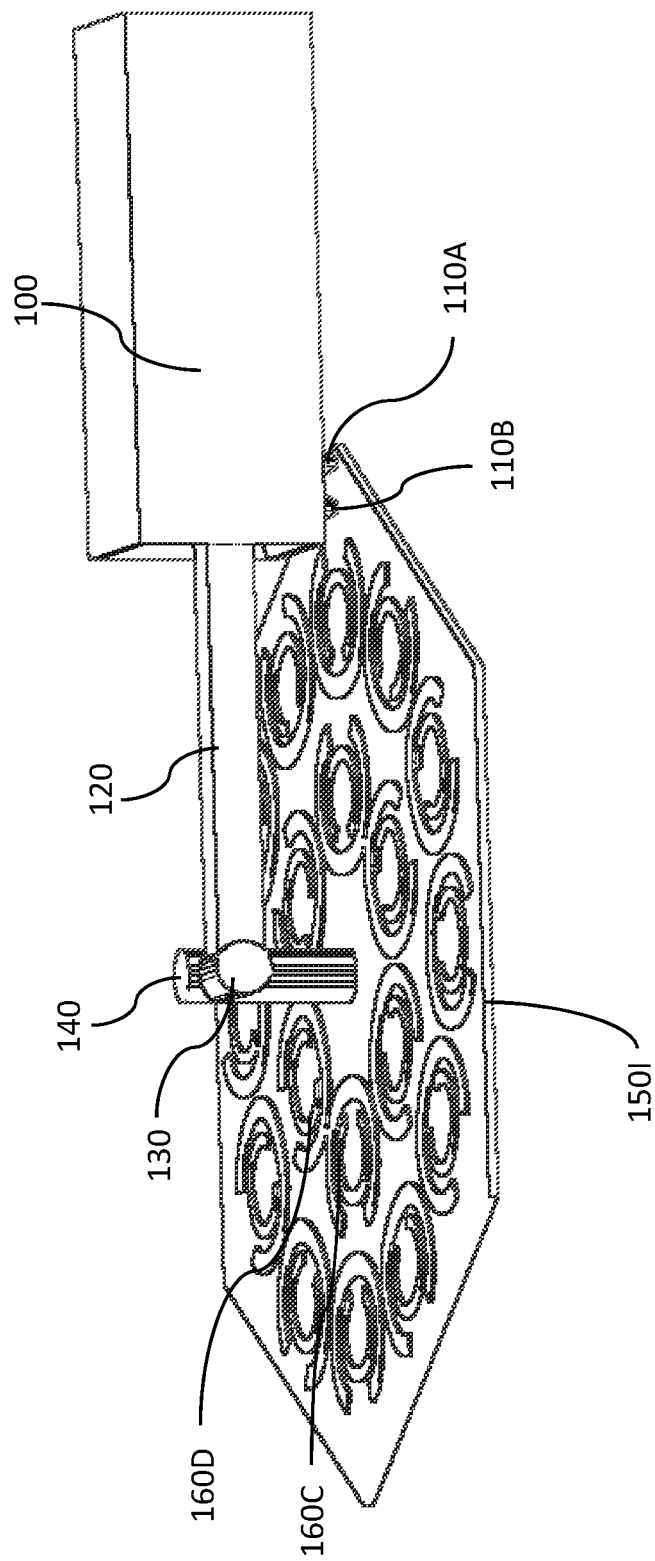
FIG. 6 is another schematic illustrating aspects of that of FIG. 5 and a continued printing building process showing two complete rings of metamaterial split-ring resonator cells in place, according to embodiments of the present disclosure.

FIG. 6 is another schematic illustrating aspects of that of FIG. 5 and a continued printing building process, according to embodiments of the present disclosure. The 3D-printed mechanical support structure 150I now has two complete rings of metamaterial split-ring resonator cells 160 in place.

Figure 7:
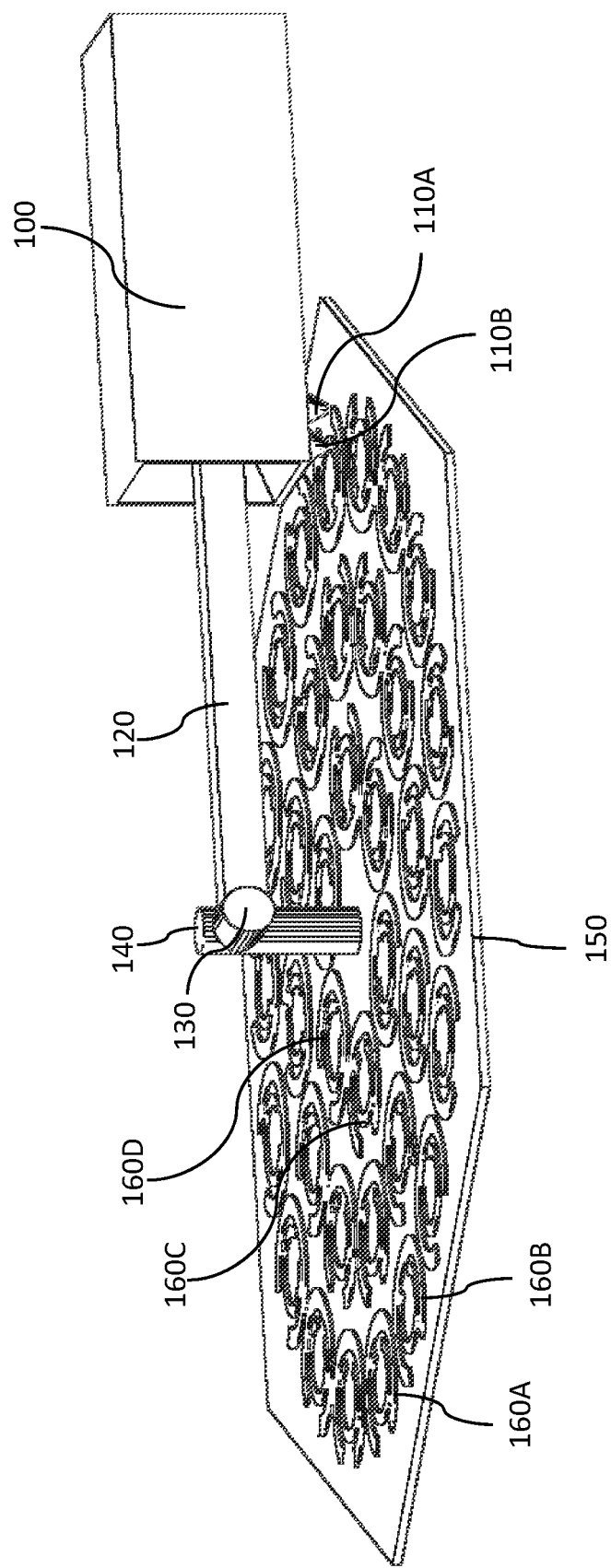
FIG. 7 is another schematic illustrating aspects of that of FIG. 6 and a continued printing building process showing three complete rings of metamaterial split-ring resonator cells in place and the completion of printing, according to embodiments of the present disclosure.

FIG. 7 shows the state at the completion of printing for this particular embodiment and/or application. The entire metamaterial array is now ready for use. Tilt motor 130 is now actuated to drive the 3D printed support structure 150 to perpendicular with respect to the long axis of spacecraft bus 100 and extensible boom 120. In this particular embodiment, the metamaterial array 160 appears mechanically flat, however it behaves electromagnetically as a parabolic reflector. This provides focusing of the beam and significant antenna gain, as noted above.

Further still, the manufactured object can include materials from the group consisting of the feedstock, an initial base structure and a metamaterial array, such that the manufactured object is one of an antenna, an antenna component, an antenna that includes a parabolic reflector or a metamaterial beam shaper. The metamaterial array can be a metamaterial, such that the metamaterial is applied by a second extruder positioned on an outer surface of the spacecraft bus, and the metamaterial is stored as a feedstock roll of self-adhesive metamaterial patterns. The metamaterial array can be a metamaterial, such that the metamaterial is extruded by a second extruder positioned on an outer surface of the spacecraft bus, and the metamaterial is a conductive material that provides at least one metamaterial behavior to the manufactured object. It is possible that the metamaterial is extruded by the second extruder into a set of shapes on the partially printed object, such that the set of shapes provide a predetermined capacitance behavior, a predetermined inductance behavior or a predetermined resonance behavior, within a predetermined radiofrequency (RF) operating frequency band, to provide an RF metamaterial behavior to the manufactured object.

Figure 8A:
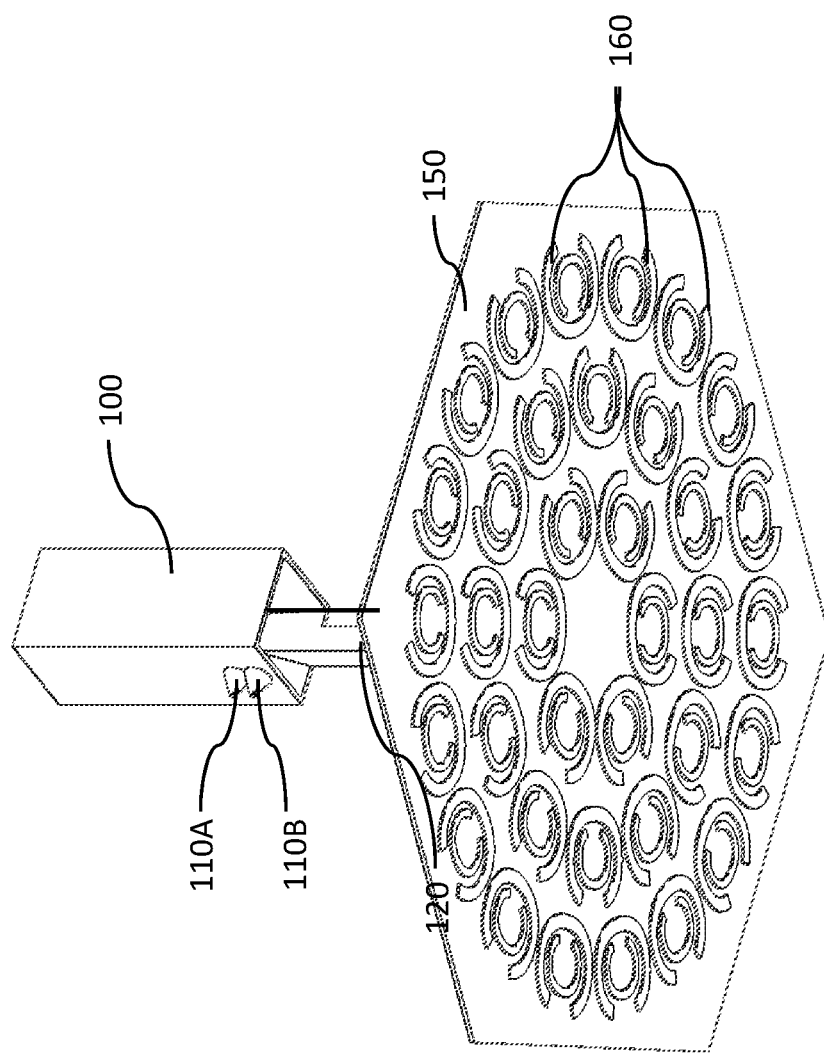
FIGS. 8A and 8B are other schematics illustrating aspects of that of FIG. 7 from different viewing angles, according to embodiments of the present disclosure.
Figure 8B:
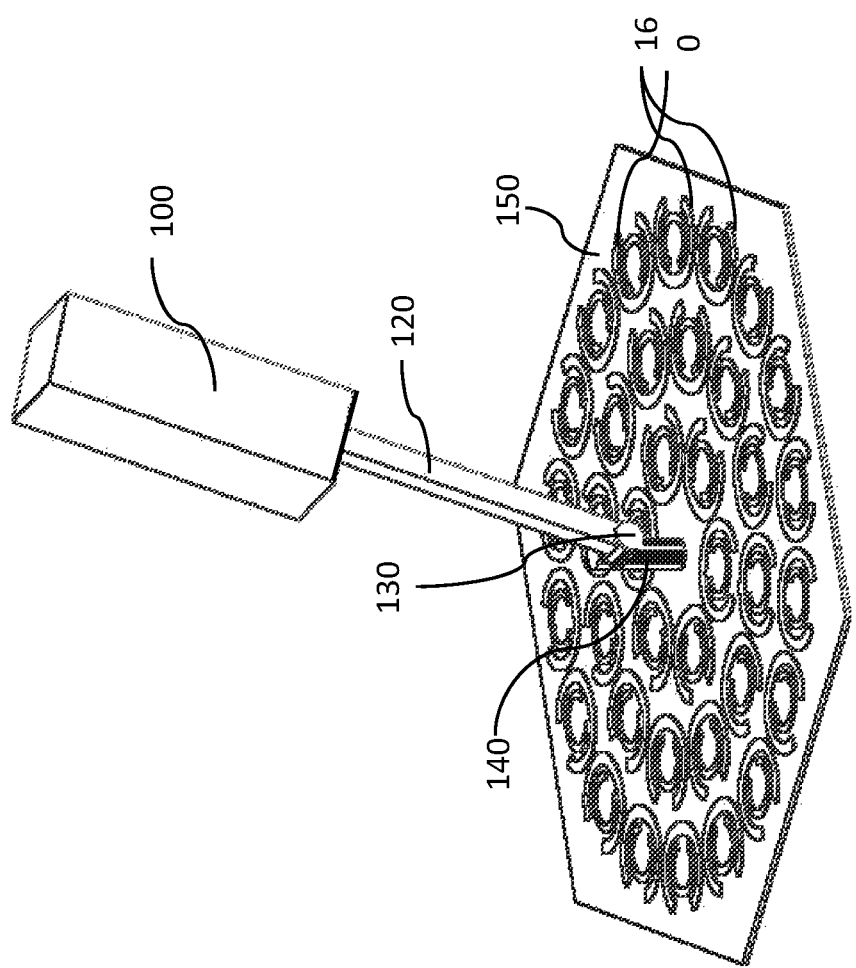

FIGS. 8A and 8B are other schematics illustrating aspects of that of FIG. 7 from different viewing angles, according to embodiments of the present disclosure. 8A shows the completed metamaterial antenna viewed from below so that the feedhorn is visible, and 8B shows the tilt motor partially rotating the antenna 150 from the printing position as shown in FIG. 7 to the final in-use position as shown in FIGS. 1 and 8A.

FIG. 9 shows an entire 3D-printed parabolic antenna ready for use, according to embodiments of the present disclosure. the spacecraft bus 100 is shown with the top face 105, extruders 110A and 110B are visible on the side of the spacecraft bus 100. The extensible boom 120 attaches the spacecraft bus 100 to the tiltmotor 130, which is in turn attached to the rotation motor 140. Also attached to the output shaft of rotation motor 140 is the entire parabolic antenna 150 or 3D-printed mechanical support structure.

It is possible that a positioning system can be mounted within the additive manufacturing system, which attaches to the telescoping linear rain or boom 120 that has multiple telescoping sections connected to a pair of rotary motor joints (tilt motor 130 and rotational motor 140) and the initial base structure 150. Wherein the pair of rotary joints 130, 140 include a first rotary joint attached to an end of the telescoping linear rain and a second rotary joint is attached to the initial base structure 150, such that the initial base structure 150 moves relative to the extruder 110A, 110B that is fixed to an outer surface of the additive manufacturing system, while the fixed extruder extrudes the feedstock to print the object. Wherein the processor determines a relative motion between the initial base structure 150 and the fixed extruder 110A, 110B during extrusion of the feedstock, based on a set of predetermined additive manufacturing actions stored in a memory in communication with the processor. It is noted that the second extruder 110B fixed to an outer surface of the additive manufacturing system can have one or more feedstock, such that the one or feedstock includes a self-adhesive conductive foil that is one of an aluminum foil, a copper foil or gold foil. It is possible the telescoping linear rain 120 and the pair of rotary joints 130, 140 after the manufacturing of the object, also control positions of the manufactured object relative to one or a combination of astronomical bodies, the spacecraft bus or an incident of environmental light.

Other features of the present disclosure include a command system in communication with a processor and the additive manufacturing system, for determining, controlling, or both, environmental conditions of an area in space proximal the components of the additive manufacturing system (i.e. including the extruder 110A, the boom 120, tilt-motor 130, rotation motor 140, 3D-printed mechanical support structure 150I or other components). The location of the command system and processor may be located on the spacecraft or some other location, i.e. directly wired to the components of the additive manufacturing system or wirelessly connected to the additive manufacturing system. Wherein the processor can control the operation of the additive manufacturing system as a function of the pose of the spacecraft bus, in combination with the command system determination of the environmental conditions or the control of the environmental conditions, of the area in space proximal to the extruder.

Specifically, the command system can determine the environmental conditions such as temperature, light, pressure, radiation, or other environmental conditions of space. As well as, control the environmental conditions, of an area in space proximal to the extruder or other components, via controllable reflectors, controllable light deflectors, controllable heating and cooling devices, controllable light sources, controllable protective shield(s), controllable devices including video and cameral devices, etc.

Figure 10:
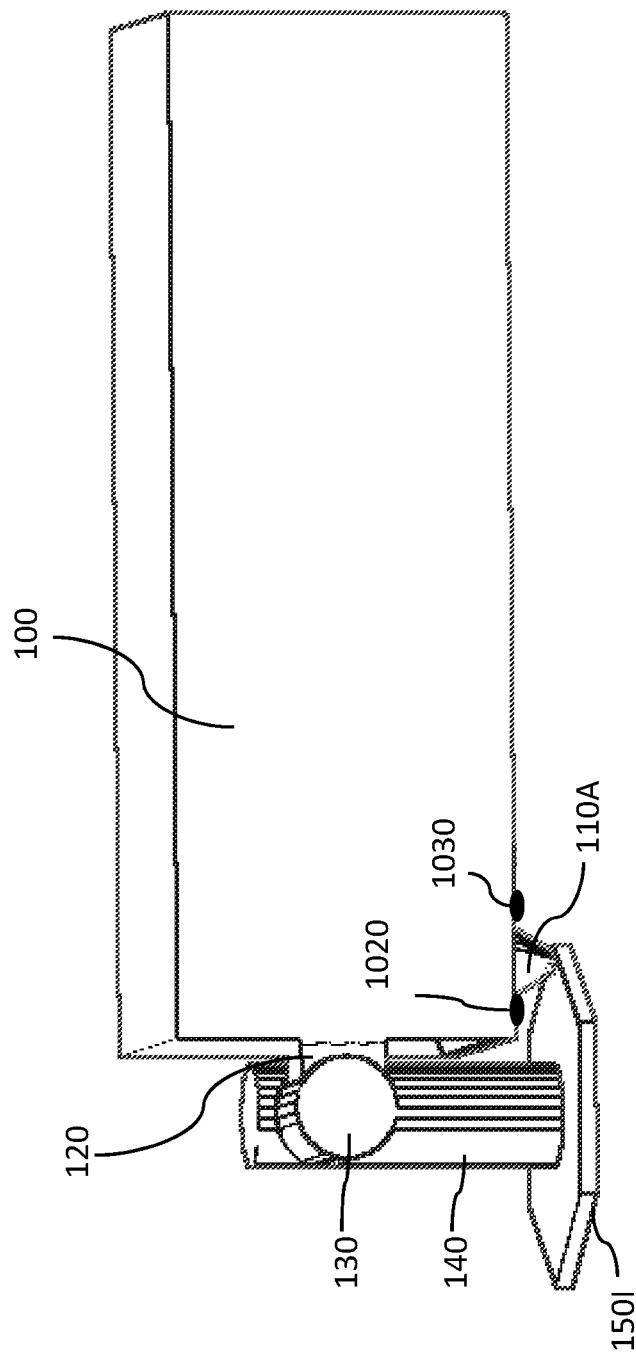
FIG. 10 is a schematic illustrating sensors of the command system positioned on an outer surface of the spacecraft bus sensing environmental conditions, according to an embodiment of the present disclosure.
Figure 11:
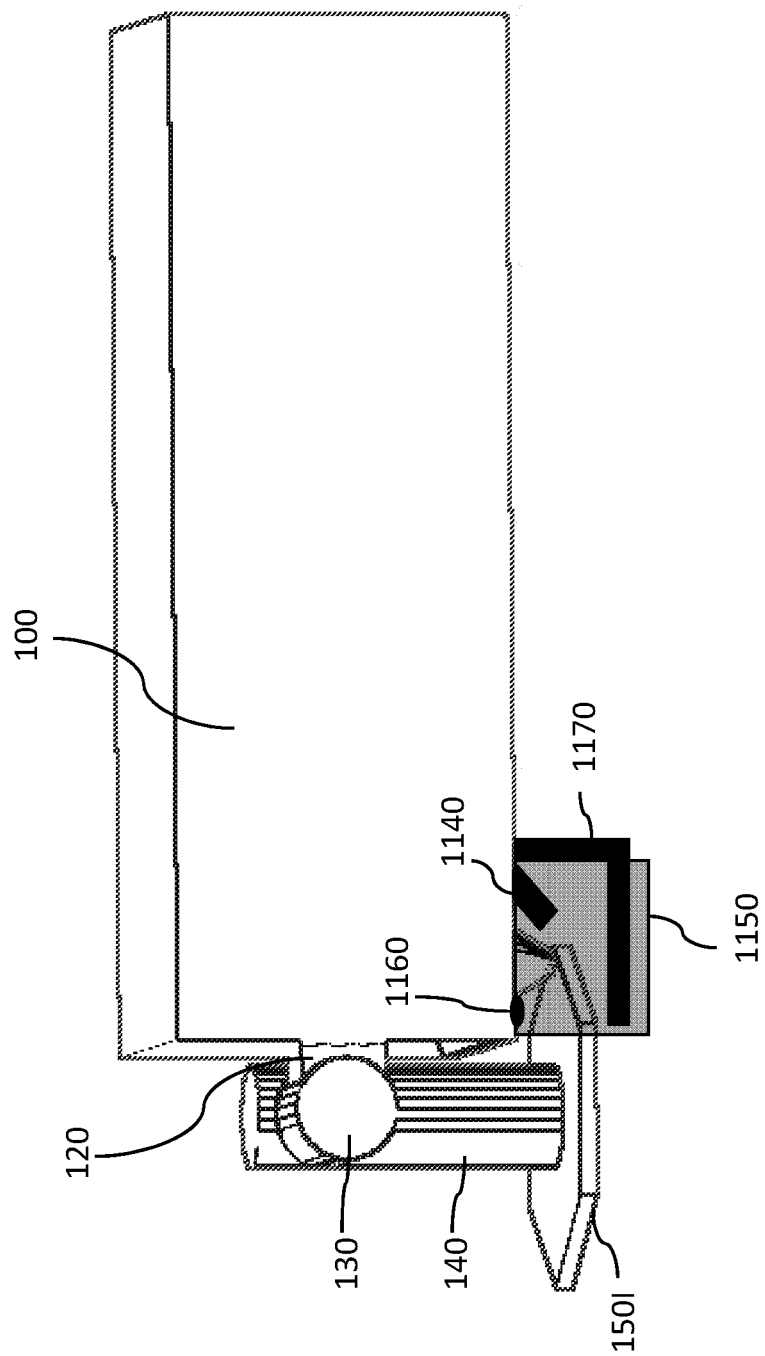
FIG. 11 is a schematic illustrating aspects that control the environmental conditions, of the area in space proximal to the extruder or other areas approximate other components, according to an embodiment of the present disclosure.
Figure 12:
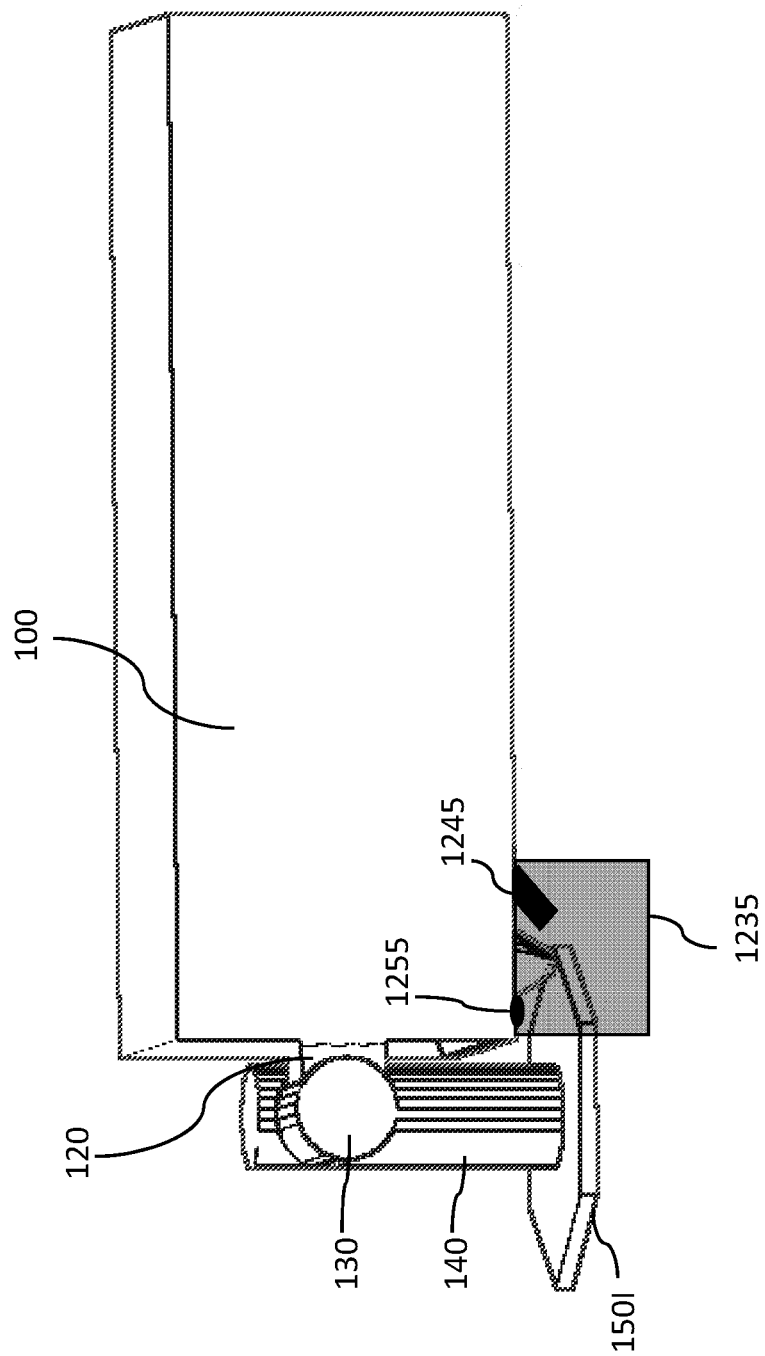
FIG. 12 is a schematic illustrating other aspects that control the environmental conditions, of the area in space proximal to the extruder or other areas approximate other components, according to an embodiment of the present disclosure.

FIG. 10, FIG. 11 and FIG. 12 are schematics illustrating sensors and devices of the command system positioned on an outer surface of the spacecraft bus, according to an embodiment of the present disclosure. By non-limiting example, temperature sensor(s) 1020 and light sensor(s) 1030 of FIG. 10 are positioned on the same outer surface wall approximate the extruder 110A. However, it is contemplated that sensors 1020, 1030, along with other sensors and devices, may be located anywhere on an outer surface of the spacecraft, or within the spacecraft. It is possible the sensors 1020, 1030, along with other sensors and devices, may be located within the spacecraft and be able to move via actuators (controlled by the processor and/or command system) from inside to outside of the spacecraft.

For example, at least one temperature sensor is in communication with the command system, and determines a temperature of the area in space proximal to the extruder. Wherein the processor controls the operation of the additive manufacturing system as a function of the pose of the spacecraft bus in combination with the determined temperature, when the determined temperature is within a predetermined range. Wherein the predetermined temperature range for the operation of the additive manufacturing system can be within a range of 10 to 50 degrees Centigrade (as would be appropriate for liquid feedstocks of the UV-curing or two-part resin/catalyst feedstocks) or 180 to 350 degrees Centigrade (as would be appropriate to a thermoplastic feedstock supplied as a meltable filament).

Further, at least one sensor in communication with the command system, determines a light level originating from space, proximal the extruder. Wherein the processor controls the operation of the additive manufacturing system as a function of the pose of the spacecraft bus in combination with the determined level of the light, when the determined level of the light is within a predetermined range. Wherein the predetermined range for the determined level of the light is within a range of 0.0001 milliwatt per square centimeter (1 watt/m$^3$) to 10.000 milliwatt per square centimeter (10 Kwatt/m$^3$).

It is possible that other sensors such as earth-facing sensors, wherein the earth-facing cameras can be used for weather and resource monitoring or any cameras used to control and monitor the 3D building process or aspects related too. Further, it is contemplated the use of fabrication-aiding sensors may be incorporated into the additive manufacturing system. Also not shown are the 3D printing feedstock reservoirs, the solar cells, the batteries, the reaction wheels or attitude-control thrusters, science or communications payloads, control processors, any low-gain, omni-directional or backup antennas, etc, may be incorporated into the spacecraft bus.

FIG. 11 illustrates aspects that control the environmental conditions, of the area in space proximal to the extruder or other areas approximate other components. For example, FIG. 11 shows a controllable light (s) 1140, a controllable protective shield(s) 1150, a controllable device(s) 1160 such as video and camera devices.

For example, at least one controllable protective shield in communication with the command system, controllably shields an amount of exposure of the light proximal the extruder. Wherein the processor controls the at least one protective shield as a function of the pose of the spacecraft bus in combination with the determined level of the light, when the determined level of the light is within a predetermined range. The controllable protective shield might be used when printing a UV-cured polymer during the sunlit part of the orbit or when printing in interplanetary space where the solar UV is nearly continuous, or to protect uncured polymer from UV reflected from the Moon when printing on the shadowed part of the orbit.

Further still, at least one controllable device such as an imaging device or camera in communication with the processor and the additive manufacturing system, generates images while the feedstock is extruded from the extruder onto an initial base structure, and based on the images, adaptively controls a rate of extrusion of the feedstock from the extruder, a rate of relative motion between the extruder to the initial base structure, or both.

Further, FIG. 11 also shows a controllable feedstock deflector 1170 that can be used to alter the flow of the feedstock, that is positioned approximate the extruder and in communication with the processor, controls flow (and expansion, if an expanding foam type feedstock is used) of the feedstock during extrusion to form at least one surface of the manufactured object. Wherein the processor controls the feedstock deflector as a function of a rate of extrusion of the feedstock from the extruder, a rate of relative motion between the extruder to the initial base structure, or both. Further still, the feedstock can be a light curable feedstock. Wherein at least one controllable light source in communication with the command system, can project one or more light beam onto a surface of the feedstock, such that the feedstock is a light-curable material. Wherein the processor controls the light source as a function of the pose of the spacecraft bus in combination with a level of the light from the controllable light source.

FIG. 12 shows a controllable light reflector(s) and a controllable light deflector(s) 1235, a controllable heating and cooling device(s) 1245 and a controllable multi-beam light source 1255 and may include multiple beams at one or more different levels of light beams.

For example, at least one controllable light reflector in communication with the command system, controllably reflects a level of light onto a surface of the feedstock, such that the feedstock is a light-curable material, and the light is one or a combination of light originating from space, or a controllable light source in communication with the command system. Wherein the processor controls the operation of the controllable light reflector as a function of the pose of the spacecraft bus in combination with the determined level of the light, when the determined level of the light is within a predetermined range.

It is not necessary that all embodiments of the present disclosure use a metamaterial as the electromagnetically active agent. If extensible boom 120, tilt motor 130, and rotation motor 140 are operated according to the equation of a parabola, it is possible to print a 3D printed support structure 150 that is mechanically and visually parabolic rather than flat. In this case, it would be appropriate to face the 3D printed support structure 150 with a conductive metal film such as metallized Mylar, producing a much more classical design. Another advantage of this non-metamaterial parabolic design is that metamaterials are often narrowband devices, operable only over a narrow wavelength range, while a metallic parabolic reflector is very wideband and could conceivably operate well over a 10:1 wavelength range.

It is not necessary that the metamaterial design used in the antenna be the split ring resonators shown. Other metamaterial unit cells such as "mushroom fields" (arrays of small capacitive hats over a conductive backplane) or self-resonant inductive coils may also be used.

Figure 13:
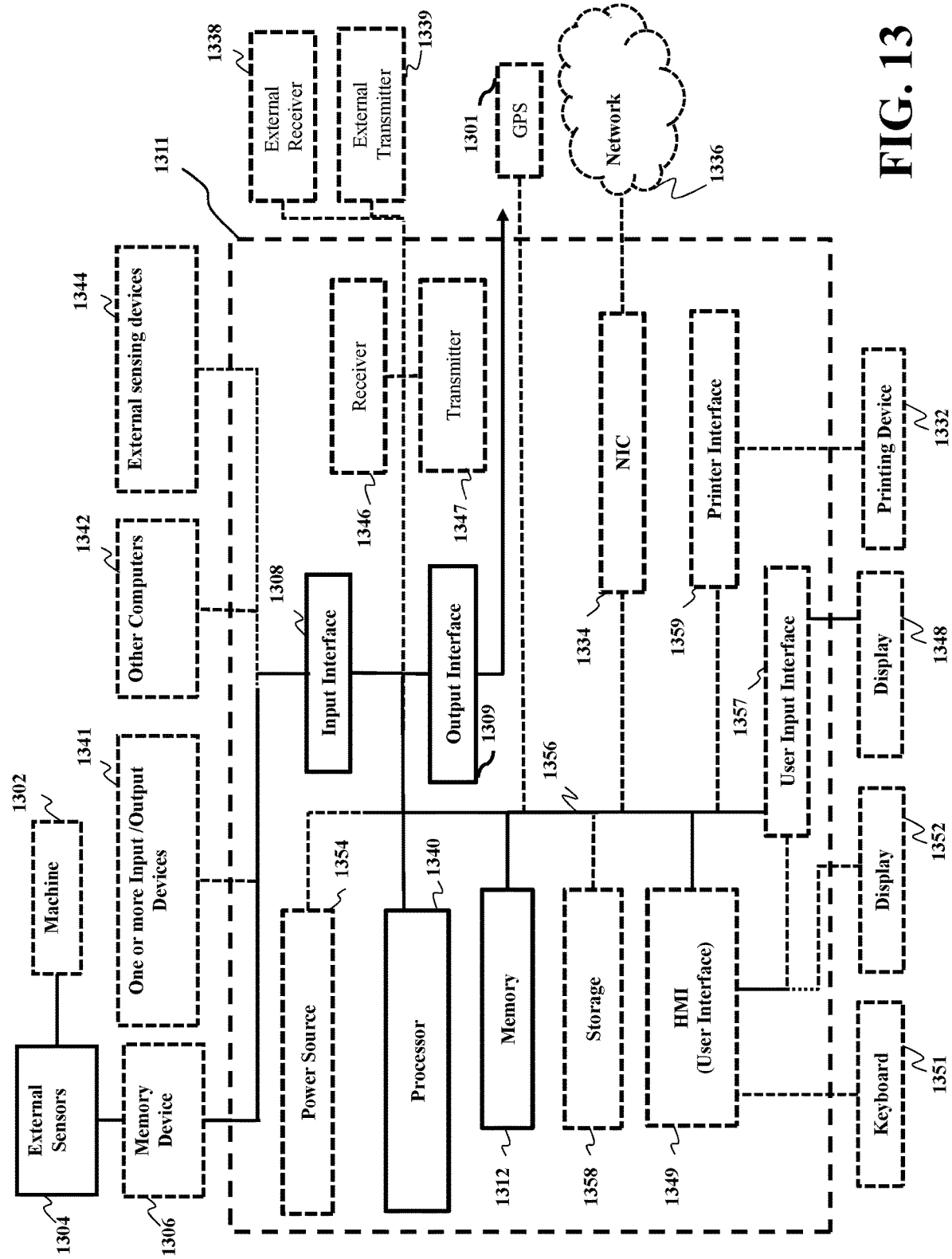
FIG. 13 is a block diagram of illustrating the processor or computer in communication with the command system of FIG. 9, that can be implemented using an alternate computer or processor, according to embodiments of the present disclosure.

FIG. 13 is a block diagram of illustrating the processor or computer in communication with the command system of FIG. 9, that can be implemented using an alternate computer or processor, according to embodiments of the present disclosure. Although many parts in FIG. 13 are not normally needed when the satellite is in orbit or in interplanetary space, they are built-in to many COTS processors, and are definitely useful during the research and development, assembly and on-ground testing and validation procedures that the satellite must be subjected to before launch. As the launch of even a small satellite represents a cost of several million dollars, it should be expected that every opportunity to test, verify, and assure complete functionality will be taken before launch.

Additionally, some of the blocks in FIG. 13 can continue to be useful after launch, as their output can be remotely linked via the NIC network interface 1334 to the appropriate physical equipment either on another spacecraft, or on a ground control station.

Referring now to FIG. 13, the controller 1311 includes a processor 1340, computer readable memory 1312, storage 1358 and user interface 1349 with display 1352 and keyboard 1351, which are connected through bus 1356. For example, the user interface 1349 in communication with the processor 1340 and the computer readable memory 1312, acquires and stores the data in the computer readable memory 1312 upon receiving an input from a surface, keyboard surface, of the user interface 1357 by a user.

Contemplated is that the memory 1312 can store instructions that are executable by the processor, historical data, and any data to that can be utilized by the methods and systems of the present disclosure. The processor 1340 can be a single core processor, a multi-core processor, a computing cluster, or any number of other configurations. The processor 1340 can be connected through a bus 1356 to one or more input and output devices. The memory 1312 can include random access memory (RAM), read only memory (ROM), flash memory, flash memory, nonvolatile memory or any other suitable memory systems.

Still referring to FIG. 13, a storage device 1358 can be adapted to store supplementary data and/or software modules used by the processor. For example, the storage device 1358 can store historical data and other related data as mentioned above regarding the present disclosure. Additionally, or alternatively, the storage device 1358 can store historical data similar to data as mentioned above regarding the present disclosure. The storage device 1358 can include a hard drive, a flash drive, a nonvolatile memory, an optical drive, a thumb-drive, an array of drives, or any combinations thereof.

The system can be linked through the bus 1356 optionally to a display interface (not shown) adapted to connect the system to a display device (not shown), wherein the display device can include a computer monitor, camera, television, projector, or mobile device, among others.

The controller 1311 can include a power source 1354, depending upon the application the power source 1354 may be optionally located outside of the controller 1311. Linked through bus 1356 can be a user input interface 1357 adapted to connect to a display device 1348, wherein the display device 1348 can include a computer monitor, camera, television, projector, or mobile device, among others. A printer interface 1359 can also be connected through bus 1356 and adapted to connect to a printing device 1332, wherein the printing device 1332 can include a liquid inkjet printer, solid ink printer, large-scale commercial printer, thermal printer, UV printer, or dye-sublimation printer, among others. A network interface controller (NIC) 1334 is adapted to connect through the bus 1356 to a network 1336, wherein data or other data, among other things, can be rendered on a third party display device, third party imaging device, and/or third party printing device outside of the controller 1311.

Still referring to FIG. 13, the data or other data, among other things, can be transmitted over a communication channel of the network 1336, and/or stored within the storage system 1358 for storage and/or further processing. Further, the data or other data may be received wirelessly or hard wired from a receiver 1346 (or external receiver 1338) or transmitted via a transmitter 1347 (or external transmitter 1339) wirelessly or hard wired, the receiver 1346 and transmitter 1347 are both connected through the bus 1356. Further, a GPS 1301 may be connected via bus 1356 to the controller 1311. The controller 1311 may be connected via an input interface 1308 to external sensing devices 1344 and external input/output devices 1341. The controller 1311 may be connected to other external computers 1342. An output interface 1309 may be used to output the processed data from the processor 1340.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described by way of examples of preferred embodiments, it is to be understood that various other adaptations and modifications can be made within the spirit and scope of the present disclosure. Therefore, it is the object of the appended claims to cover all such variations and modifications as come within the true spirit and scope of the present disclosure.

What is claimed is:

1. A spacecraft, comprising:
    a spacecraft bus including an additive manufacturing system having a fixed initial base structure prior to entering a space environment, wherein the additive manufacturing system includes at least one extruder for delivering feedstock to the initial base structure to print an object located in, and directly exposed to, environmental effects of the space environment of space outside of the spacecraft bus;
    a sensor of the spacecraft bus determines a pose of the spacecraft bus relative to an astronomical body; and
    at least one processor in communication with the additive manufacturing system and the sensor, controls an operation of the fixed initial base structure supporting the at least one extruder of the additive manufacturing system via an internal additive manufacturing system positioning system as a function of the pose of the spacecraft bus that includes controlling at least one environmental effect of the environmental effects of the space environment by movement of the spacecraft bus, and moving the fixed initial base structure supporting the at least one extruder with the feedstock to different manufacturing locations located in, and directly exposed to, the environmental effects of the space environment of space outside of the spacecraft bus while the at least one extruder is extruding feedstock to the fixed initial base structure to the different manufacturing locations, based on the pose of the spacecraft bus, wherein the manufactured object upon completion includes the fixed initial base structure and is operationally controllable by the at least one processor via the controlling of the additive manufacturing system.

2. The spacecraft of claim 1, wherein the pose of the spacecraft bus includes one or combination of an attitude of the spacecraft bus and an orbital position of the spacecraft bus with respect to the astronomical body, such that the astronomical body is from the group consisting of the Sun, the Earth, the Moon or fixed stars.

3. The spacecraft of claim 1, further comprising:
    a command system in communication with the at least one processor and the additive manufacturing system, for determining, controlling, or both, environmental conditions of an area in space proximal the at least one extruder, wherein the at least one processor controls the operation of the additive manufacturing system as a function of the pose of the spacecraft bus, in combination with the command system for determination of the environmental conditions or the control of the environmental conditions, of the area in space proximal to the at least one extruder.

4. The spacecraft of claim 3, further comprising:
at least one temperature sensor in communication with the command system, determines a temperature of the area in space proximal to the at least one extruder, wherein the at least one processor controls the operation of the additive manufacturing system as a function of the pose of the spacecraft bus in combination with the determined temperature, when the determined temperature is within a predetermined range.

5. The spacecraft of claim 4, wherein the predetermined temperature range for the operation of the additive manufacturing system is within a range of 10 to 50 degrees Centigrade or 180 to 350 degrees Centigrade.

6. The spacecraft of claim 3, further comprising:
at least one sensor in communication with the command system, determines a light level originating from space, proximal the at least one extruder, wherein the at least one processor controls the operation of the additive manufacturing system as a function of the pose of the spacecraft bus in combination with the determined level of the light, when the determined level of the light is within a predetermined range.

7. The spacecraft of claim 6, wherein the predetermined range for the determined level of the light is within a range of 0.0001 milliwatt per square centimeter (10 watt/m$^3$) to 10.000 milliwatt per square centimeter (10 Kwatt/m$^3$).

8. The spacecraft of claim 3, further comprising:
at least one controllable light reflector in communication with the command system, controllably reflects a level of light onto a surface of the feedstock, such that the at least one controllable light reflector controllably emits, reflects, or blocks a level of light onto a surface of the feedstock, wherein the feedstock is a light-curable material, and the light is a light originating from space, wherein the at least one processor controls the operation of the at least one controllable light reflector as a function of the pose of the spacecraft bus.

9. The spacecraft of claim 6, further comprising:
at least one controllable protective shield in communication with the command system, controllably shields an amount of exposure of the light proximal the at least one extruder, wherein the at least one processor controls the at least one protective shield as a function of the pose of the spacecraft bus in combination with the determined level of the light, when the determined level of the light is within a predetermined range.

10. The spacecraft of claim 3, wherein the feedstock is a light curable feedstock.

11. The spacecraft of claim 3, further comprising:
at least one controllable light source in communication with the command system, projecting one or more light beam onto a surface of the feedstock, such that the feedstock is a light-curable material, wherein the at least one processor controls the light source as a function of the pose of the spacecraft bus in combination with a level of the light from the controllable light source.

12. The spacecraft of claim 1, further comprising:
at least one controllable device such as an imaging device or camera in communication with the at least one processor and the additive manufacturing system, generates images while the feedstock is extruded from the at least one extruder onto the initial base structure, and based on the images, adaptively controls a rate of extrusion of the feedstock from the at least one extruder, a rate of relative motion between the at least one extruder to the initial base structure, or both.

13. The spacecraft of claim 1, further comprising:
at least one attitude control system mounted on the spacecraft bus for providing a motive force to maintain the pose of the spacecraft bus at or near a set of target poses, wherein the set of target poses are determined by a set of predetermined poses stored in a memory in communication with the at least one processor.

14. The spacecraft of claim 13, wherein the attitude control system is composed of one or more of reaction wheels, control moment gyroscopes, magnetic torquers, cold-gas thrusters, monopropellant thrusters, bipropellant thrusters, hall effect thrusters or ion thrusters.

15. The spacecraft of claim 1, further comprising:
at least one controllable feedstock deflector positioned approximate the at least one extruder and in communication with the at least one processor, controls flow of the feedstock during extrusion to form at least one surface of the manufactured object, wherein the at least one processor controls the feedstock deflector as a function of a rate of extrusion of the feedstock from the at least one extruder, a rate of relative motion between the at least one extruder to the initial base structure, or both.

16. The spacecraft of claim 1, wherein the internal additive manufacturing system positioning system is a positioning system mounted within the additive manufacturing system, includes a telescoping linear ram having multiple telescoping sections connected to a pair of rotary joints and the initial base structure, wherein the pair of rotary joints include a first rotary joint attached to an end of the telescoping linear ram and a second rotary joint is attached to the initial base structure, such that the initial base structure moves relative to the at least one extruder that is fixed to an outer surface of the additive manufacturing system, while the fixed extruder extrudes the feedstock to print the object, wherein the at least one processor determines a relative motion between the initial base structure and the fixed extruder during extrusion of the feedstock, based on a set of predetermined additive manufacturing actions stored in a memory in communication with the at least one processor.

17. The spacecraft of claim 1, wherein the manufactured object is one or a combination of a non-foldable object, a non-planar structure, a flat object, a partially complete object structure.

18. The spacecraft of claim 1, further comprising:
a second extruder fixed to an outer surface of the additive manufacturing system, the second extruder having one or more feedstock, such that the one or feedstock includes a self-adhesive conductive foil that is one of an aluminum foil, a copper foil or gold foil.

19. The spacecraft of claim 1, wherein a size of the manufactured object includes at least one dimension of a diagonal dimension of the manufactured object that is greater than any set of dimensions or diagonal dimensions for all internal enclosures of the spacecraft bus which prevents the manufactured object from being inserted within or enclosed by, any internal enclosures of the spacecraft bus.

20. The spacecraft of claim 1, wherein the manufactured object includes materials from the group consisting of the feedstock, the initial base structure and a metamaterial array, such that the manufactured object is one of an antenna, an antenna component, an antenna that includes a parabolic reflector or a meta-material beam shaper.

21. The spacecraft of claim 20, where the antenna parabolic reflector is rendered reflective to a band of radio frequencies.

22. The spacecraft of claim 16, wherein the manufactured antenna has a length approximate an extended length of the telescoping linear ram.

23. The spacecraft of claim 20, wherein the metamaterial array is a metamaterial, such that the metamaterial is applied by a second extruder positioned on an outer surface of the spacecraft bus, and the metamaterial is stored as a feedstock roll of self-adhesive metamaterial patterns.

24. The spacecraft of claim 20, wherein the metamaterial array is a metamaterial, such that the metamaterial is extruded by a second extruder positioned on an outer surface of the spacecraft bus, and the metamaterial is a conductive material that provides at least one metamaterial behavior to the manufactured object.

25. The spacecraft of claim 24, wherein the metamaterial is extruded by the second extruder into a set of shapes on the partially printed object, such that the set of shapes provide a predetermined capacitance behavior, a predetermined inductance behavior or a predetermined resonance behavior, within a predetermined radiofrequency (RF) operating frequency band, to provide an RF metamaterial behavior to the manufactured object.

26. The spacecraft of claim 1, wherein the operation of the additive manufacturing system includes moving the at least one extruder from an internal enclosure of the spacecraft bus to outside of the spacecraft bus, based on the pose of the spacecraft bus.

27. The spacecraft of claim 1, wherein the additive manufacturing system includes one of a three degree of freedom printer, a four degree of freedom printer, a five degree of freedom printer, or a six degree of freedom printer.

28. A spacecraft, comprising:
a spacecraft bus having internal enclosures, wherein each internal enclosure has a set of dimensions including diagonal dimensions;
an additive manufacturing system having a fixed initial base structure of the spacecraft bus and includes at least one extruder for delivering feedstock to the fixed initial base structure to print an object outside of the spacecraft bus, the object is located in, and directly exposed to, environmental effects of a space environment of space;
a sensor of the spacecraft bus for determining a pose of the spacecraft bus relative to an astronomical body; and
at least one processor in communication with the additive manufacturing system and the sensor, controls an operation of the fixed initial base structure supporting the at least one extruder of the additive manufacturing system as a function of the pose of the spacecraft bus that includes controlling at least one environmental effect of the environmental effects of the space environment by movement of the spacecraft bus, and moving the fixed initial base structure supporting the at least one extruder with the feedstock to different manufacturing locations located in, and directly exposed to, the environmental effects of the space environment of space outside of the spacecraft bus while the at least one extruder is extruding feedstock to the fixed initial base structure to the different manufacturing locations, based on the pose of the spacecraft bus,
wherein the manufactured object upon completion includes the fixed initial base structure and is operationally controllable by the at least one processor via the controlling of the additive manufacturing system.

29. A spacecraft, comprising:
a spacecraft bus having internal enclosures, wherein each internal enclosure has a set of dimensions including diagonal dimensions;
an additive manufacturing system having an initial base structure fixed to an outer surface of the additive manufacturing system of the spacecraft bus and includes at least one extruder for delivering feedstock to the initial base structure to print an object located in, and directly exposed to, environmental effects of a space environment of space outside of the spacecraft bus;
a sensor of the spacecraft bus determines a pose of the spacecraft bus relative to an astronomical body;
a command system in communication the additive manufacturing system and the sensor, for determining, controlling or both, environmental conditions of an area in space proximal the at least one extruder; and
at least one processor controls the operation of the initial base structure supporting the at least one extruder of the additive manufacturing system as a function of the pose of the spacecraft bus, that includes controlling at least one environmental effect of the environmental effects of the space environment by movement of the spacecraft bus, and moving the initial base structure supporting the at least one extruder with the feedstock to different manufacturing locations located in, and directly exposed to, the environmental effects of the space environment of space outside of the spacecraft bus, while the at least one extruder is extruding feedstock to the initial base structure to the different manufacturing locations, based on the pose of the spacecraft bus, and in combination with the command system for determination of the environmental conditions or control of the at least one environmental condition of the area in space proximal to the at least one extruder,
wherein the manufactured object upon completion includes the initial base structure and is operationally controllable by the at least one processor via the controlling of the additive manufacturing system.

30. The spacecraft of claim 1, wherein the environmental effects of the space environment include one or a combination of light, radiation or temperature.

31. The spacecraft of claim 29, wherein the controlling the spacecraft pose, controls the orientation of the spacecraft relative to the astronomical body, that also includes one or a combination of controlling a rate of change of light, a rate of change of radiation, a rate of change of temperature, a rate of change of other environmental conditions of space or an amount of temperature, by the movement of spacecraft bus.

32. A spacecraft, comprising:
a spacecraft bus having internal enclosures, wherein each internal enclosure has a set of dimensions including diagonal dimensions;
an additive manufacturing system having an initial base structure fixed to an outer surface of the additive manufacturing system of the spacecraft bus and includes at least one extruder for delivering feedstock to the initial base structure to print an object located in, and directly exposed to, environmental effects of a space environment of space outside of the spacecraft bus;
a sensor of the spacecraft bus determines a pose of the spacecraft bus relative to an astronomical body;
a command system in communication the additive manufacturing system and the sensor, for determining, controlling or both, environmental conditions of an area in space proximal the at least one extruder; and at least one processor controls the operation of the initial base structure supporting the at least one extruder of the additive manufacturing system as a function of the pose of the spacecraft bus, that includes controlling at least one environmental effect of the environmental effects of the space environment by movement of the spacecraft bus, and moving the initial base structure supporting the at least one extruder with the feedstock to different manufacturing locations located in, and directly exposed to, the environmental effects of the space environment of space outside of the spacecraft bus, while the at least one extruder is extruding feedstock to the initial base structure to the different manufacturing locations, based on the pose of the spacecraft bus, and in combination with the command system for determination of the environmental conditions or control of the at least one environmental condition of the area in space proximal to the at least one extruder, wherein the controlling of the at least one environmental condition of the environmental conditions, of the area in space proximal to the at least one extruder or other components, includes one or a combination of controllable reflectors, controllable light deflectors, controllable heating and cooling devices, controllable light sources, controllable protective shields or controllable devices including video and camera devices, and wherein the manufactured object upon completion includes the initial base structure and is operationally controllable by the at least one processor via the controlling of the additive manufacturing system.

* * * * *